(12) United States Patent
Whitehead et al.

(10) Patent No.: US 7,997,835 B2
(45) Date of Patent: Aug. 16, 2011

(54) MULTIPLE CHUCK HAND TOOL

(75) Inventors: John Whitehead, Jerilderie (AU); Iain White, Portland (AU); Mark Van Vegten, Ferntree Gully (AU)

(73) Assignee: Whitehot Solutions Pty. Ltd., Jerilderie, New South Wales (AU)

( * ) Notice: Subject to any disclaimer, the term of this patent is extended or adjusted under 35 U.S.C. 154(b) by 0 days.

(21) Appl. No.: 12/762,858

(22) Filed: Apr. 19, 2010

(65) Prior Publication Data

US 2010/0202842 A1    Aug. 12, 2010

Related U.S. Application Data

(63) Continuation of application No. PCT/AU2008/001531, filed on Oct. 16, 2008.

(30) Foreign Application Priority Data

Oct. 19, 2007  (AU) ................................ 2007905733
Feb. 29, 2008  (AU) ................................ 2008901002

(51) Int. Cl.
*B23B 39/20*    (2006.01)

(52) U.S. Cl. ............. 408/16; 408/35; 408/124; 408/139

(58) Field of Classification Search .................... 408/16, 408/35, 139, 140; 29/35.5, 39, 40; 81/57.22, 81/57.23; 279/14; 483/50, 51, 55, 56; *B23B 39/20, B23B 45/00, 47/00*
See application file for complete search history.

(56) References Cited

U.S. PATENT DOCUMENTS

| 2,303,565 A | 12/1942 | Luna |
| 2,491,859 A | 12/1949 | Hijmans |
| 2,738,691 A | 3/1956 | Schwab |
| 2,866,530 A | 12/1958 | Charlat |

(Continued)

FOREIGN PATENT DOCUMENTS

AU            631615         10/1990

(Continued)

OTHER PUBLICATIONS

International Searching Authority, "International Search Report," issued in connection with international application serial No. PCT/AU2008/001531, mailed Nov. 25, 2008, 3 pages.

(Continued)

*Primary Examiner* — Eric A Gates
(74) *Attorney, Agent, or Firm* — Hanley, Flight & Zimmerman, LLC

(57) ABSTRACT

A tool (10) including a drive shaft (36) having an axis of rotation, and a plurality of bit holders (28,30) interchangeable with one another at a position of use. The bit holders (28,30) being mounted on a turret (26) which is rotatable around an axis (k) set at an angle to the axis of rotation of the drive shaft (36). The drive shaft (36) being in drive connection with a respective bit holder (28,30) at the position of use, wherein the tool (10) includes means (20x) for engaging a clutch (46) which activates a drive train (44) to establish a drive connection between the drive shaft (36) and the turret (26) so that subsequent operation of the drive shaft (36) rotates the turret (26) to interchange the positions of the bit holders (28,30) at the position of use, and wherein after the turret (26) has been rotated the clutch (46) is disengaged to deactivate the drive train (44) to prevent any further rotation of the turret (26).

36 Claims, 17 Drawing Sheets

U.S. PATENT DOCUMENTS

| | | | |
|---|---|---|---|
| 2,919,609 | A | 1/1960 | Klingbeil |
| 4,211,509 | A | 7/1980 | Dietrich |
| 5,149,230 | A | 9/1992 | Nett |
| 5,573,358 | A | 11/1996 | Gobbers et al. |
| 5,797,670 | A * | 8/1998 | Snoke et al. ............ 362/119 |
| 6,506,002 | B1 | 1/2003 | Cummins |
| 6,715,969 | B2 | 4/2004 | Eriksen |
| 7,066,692 | B2 | 6/2006 | Kuhn |
| 7,080,964 | B2 * | 7/2006 | Riley et al. ............ 408/16 |
| 7,137,761 | B2 * | 11/2006 | Hara et al. ............ 408/16 |
| 7,185,998 | B2 * | 3/2007 | Oomori et al. ............ 362/119 |
| 7,367,757 | B2 | 5/2008 | Phillips |
| 7,371,033 | B2 | 5/2008 | Whitehead |
| D607,705 | S | 1/2010 | Murray |
| 7,649,337 | B2 * | 1/2010 | Uehlein-Proctor et al. ... 320/112 |
| 7,677,752 | B2 * | 3/2010 | Tadokoro et al. ............ 362/119 |
| D627,616 | S * | 11/2010 | Whitehead et al. ............ D8/69 |
| 2003/0165365 | A1 | 9/2003 | Eriksen |
| 2006/0112581 | A1 * | 6/2006 | Nortmann et al. ............ 33/638 |
| 2006/0147283 | A1 * | 7/2006 | Phillips ............ 408/35 |
| 2007/0098507 | A1 | 5/2007 | Whitehead |
| 2009/0022557 | A1 * | 1/2009 | Whitehead ............ 408/35 |

FOREIGN PATENT DOCUMENTS

| | | |
|---|---|---|
| AU | 199515047 | 10/1995 |
| AU | 1066500 | 6/2000 |
| AU | 4201600 | 4/2001 |
| AU | 9164201 | 4/2002 |
| AU | 2004242914 | 12/2004 |
| AU | 2004290608 | 6/2005 |
| AU | 2005203434 | 2/2006 |
| AU | 2006235202 | 10/2006 |
| CA | 2145116 | 9/1995 |
| CN | 1125651 | 7/1996 |
| CN | 201049399 | 4/2008 |
| CN | 201049400 | 4/2008 |
| DE | 3607486 A1 * | 9/1987 |
| DE | 4204420 A1 * | 8/1993 |
| DE | 4340740 | 6/1995 |
| DE | 20205898 | 10/2002 |
| EP | 0673723 | 9/1995 |
| EP | 1333965 | 8/2008 |
| EP | 1952947 | 8/2008 |
| FR | 2230444 | 12/1974 |
| GB | 764671 | 12/1956 |
| GB | 1297577 | 11/1972 |
| GB | 1486524 | 9/1977 |
| GB | 2343646 | 5/2000 |
| JP | 2002011671 | 1/2002 |
| TW | 529983 | 2/2002 |
| TW | 500650 | 9/2002 |
| TW | M251665 | 12/2004 |
| WO | 0029173 | 5/2000 |
| WO | 0117728 | 3/2001 |
| WO | 0226453 | 4/2002 |
| WO | 2004105986 | 12/2004 |
| WO | 2005049281 | 6/2005 |
| WO | 2006108220 | 10/2006 |
| WO | 2007093959 | 8/2007 |
| WO | 2009049367 | 4/2009 |

OTHER PUBLICATIONS

International Bureau, "International Preliminary Report on Patentability," issued in connection with international application serial No. PCT/AU2006/000483, issued Oct. 16, 2007, 5 pages.

International Searching Authority, "Written Opinion of the International Searching Authority," issued in connection with international application serial No. PCT/AU2006/000483, mailed Jun. 26, 2006, 4 pages.

International Searching Authority, "International Search Report," issued in connection with international application serial No. PCT/AU2006/000483, mailed Jun. 26, 2006, 3 pages.

Taiwan Patent Office, "Search Report," issued in connection with Taiwan Patent Application No. 095137586, with English translation, completed Mar. 13, 2008, 2 pages.

The Patent Office of the Peoples Republic of China, "First Office Action," with English translation, issued in connection with Chinese application serial No. 200680000149.3, issued Feb. 15, 2008, 16 pages.

United States Patent and Trademark Office, "Non-Final Office Action," issued in connection with U.S. Appl. No. 11/911,170, mailed Jul. 7, 2009, 6 pages.

International Bureau, "International Preliminary Report on Patentability," issued in connection with international application serial No. PCT/AU2008/001531, issued Apr. 20, 2010, 4 pages.

United States Patent and Trademark Office, "Non-Final Office Action," issued in connection with U.S. Appl. No. 29/338,904, mailed Mar. 10, 2010, 14 pages.

International Bureau, "Written Opinion of the International Searching Authority," issued in connection with international application serial No. PCT/AU2008/001531, mailed Nov. 25, 2008, 3 pages.

* cited by examiner

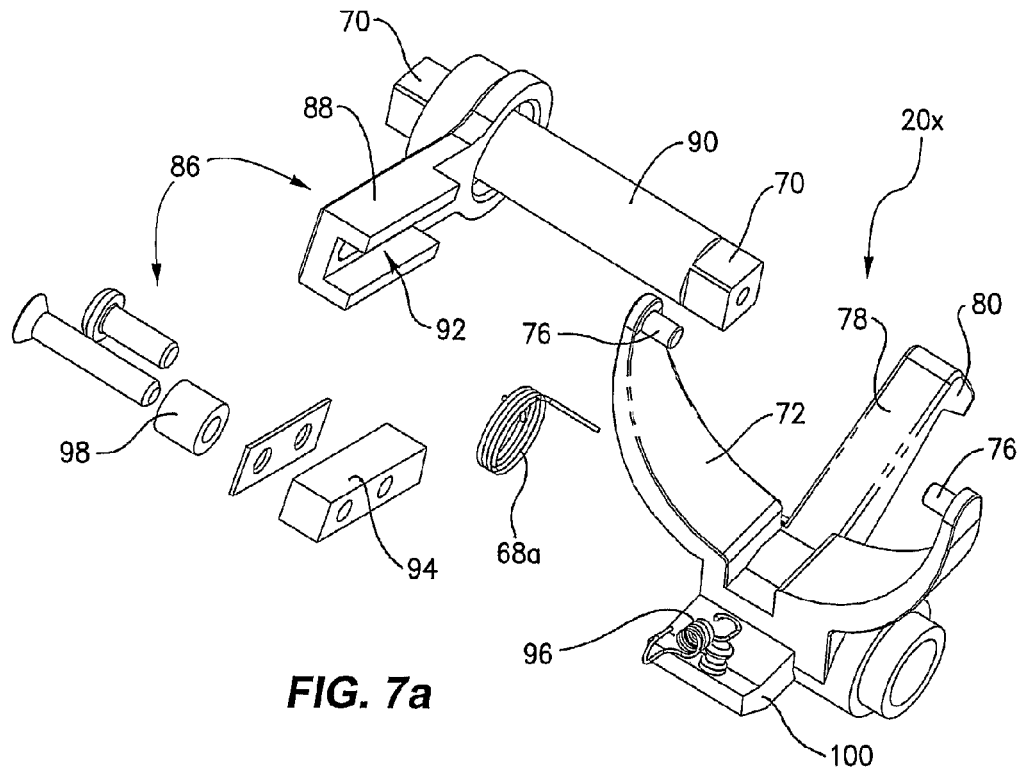
FIG. 7a
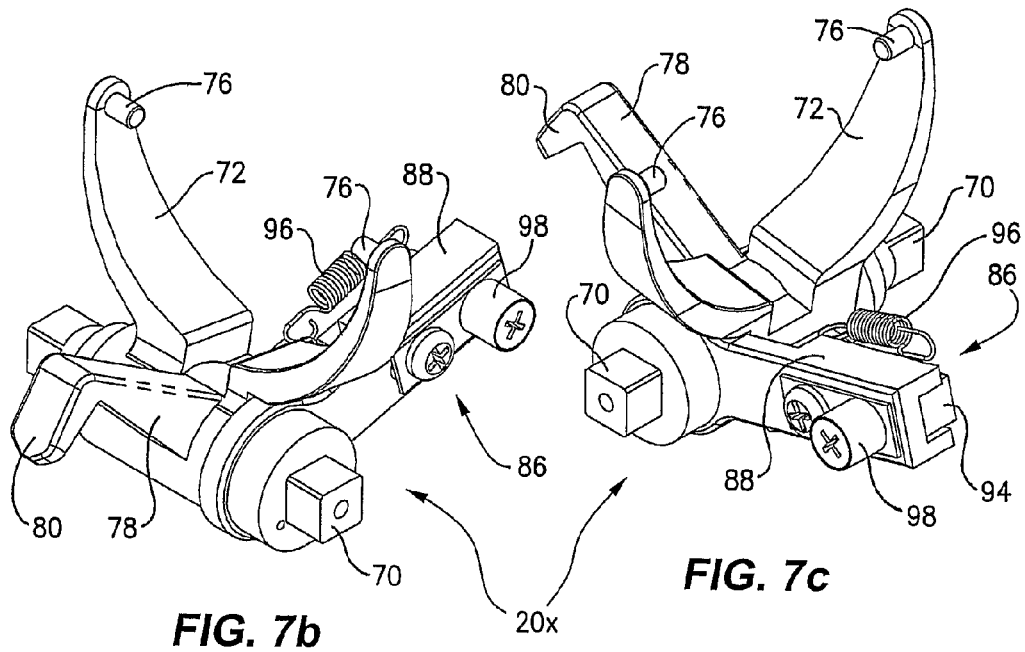
FIG. 7b
FIG. 7c

MULTIPLE CHUCK HAND TOOL

RELATED APPLICATIONS

This patent arises as a continuation of International Patent Application Serial Number, PCT/AU2008/001531, filed on Oct. 16, 2008, titled "MULTIPLE CHUCK HAND TOOL", which claims priority to Australian Provisional Patent Application Number 2008901002, filed on Feb. 29, 2008 and Australian Provisional Patent Application Number 2007905733, filed on Oct. 19, 2007. International Patent Application PCT/AU2008/001531, Australian Provisional Patent Application 2008901002, and Australian Provisional Patent Application 2007905733 are incorporated herein by reference in their entireties.

TECHNICAL FIELD

The present invention relates, generally, to hand tools and relates particularly, though not exclusively, to a hand tool having a plurality of turret mounted rotatable bit holders that can each be selectively brought to a position of use in front of the tool. The present invention is particularly suited, although not exclusively so, to a tool such as a pistol-grip power drill, or an attachment for a pistol-grip power drill, having chucks providing the bit holders for receipt of tool bits. When embodied as a pistol-grip power drill, the present invention provides a multiple chuck hand power tool having an automated chuck exchange system that is purposely designed for single handed operation.

Throughout the ensuing description the expressions "bit(s)", "tool bit(s)" and "drill bit(s)" are intended to refer to any suitable drill or tool device which can be mounted in the bit holders of the tool of the present invention and which can be used to perform various actions including, but not limited to, drilling, grinding, countersinking, enlarging, threading and/or screwing.

BACKGROUND ART

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure herein.

International Patent Application No. PCT/US2000/009080 (WO 2001/017728) by Richard D. Cummins, describes a hand power drill having a drive shaft and a turret that is manually rotatable about an axis set at 45° to the rotational axis of the drive shaft. The turret has two chucks arranged at 90° to one another that are arcuately spaced around the axis of rotation of the turret. A user of the power drill can load each of the chucks with an appropriately-sized drill bit so that each drill bit can be used in turn to conduct a particular operation requiring the use of two bits. To interchange the drill bits the user must hold the pistol-grip of the power drill in one hand and, after disengaging the drill shaft from a first chuck currently at a position of use, manually turn the turret through an angle of 180°. This action brings a second chuck, and corresponding drill bit, to the position of use, wherein the user can then selectively re-engage the drive shaft with this second chuck to facilitate use of that drill bit.

A hand power drill having a similar manually operable multiple chuck change mechanism is described in International Patent Application No. PCT/DK2001/000623 (WO 2002/026453) by Steen Mandsfelt Eriksen. Like the Cummins device, this power drill also has two chucks mounted on a turret that must be manually turned through an angle of 180° in order to interchange the drill bits at the position of use in front of the device.

There are many situations in which a user of a power drill does not have both hands free. If both hands are not free, a user cannot interchange the chucks, and hence the drill bits, without taking a risk of some sort. One such situation occurs when a user is drilling an overhead hole while standing above ground level on a ladder. In order to safely interchange the positions of drill bits when using either one of the power drills described above, a user must descend a ladder to manually turn the turret to bring a new drill bit to the position of use, after which he or she can re-ascend the ladder to continue using the power drill with a new drill bit in place.

In developed counties occupational health and safety ("OH&S") regulations are continually changing to ensure that peoples lives are not put at risk whilst performing day to day activities at work. In Australia, OH&S regulations stipulate that work with tools on ladders should not necessitate releasing ones grip on the ladder to use a tool. Hence, a single handed automated chuck exchange system for a multiple chuck hand power tool is the only alternative to repeatedly descending and ascending of ladders.

A multiple chuck hand power drill which addresses this very problem, and hence, which includes an automated chuck exchange system and can be operated with a single hand, is described in International Patent Application No. PCT/AU2006/000483 (WO 2006/108220). This application is an earlier application made by the present applicant and its entire disclosure is incorporated herein by this reference. Described in this earlier application is a hand power drill having a plurality of turret mounted chucks which can each be selectively brought to a position of use in front of the tool by way of an automated chuck exchange system. To facilitate the process of automatically switching between chucks at the position of use, the drive shaft of this power drill is reciprocal between first and second axially-spaced locations at which, respectively, the drive shaft is engaged and disengaged from a chuck at the position of use. The positioning of the drive shaft being such that at the second location a drive connection between the drive shaft and the turret is established so that subsequent operation of the drive shaft rotates the turret and interchanges the positions of the chucks at the position of use. The drive shaft being adapted to return to its first location and restore the drive connection with a new chuck at the position of use after the turret has been rotated.

Although the basic principles of the automated chuck exchange system presented in this earlier application remain sound, it has been found that the particular mechanical embodiments that were presented are not ideal from a manufacturing and/or product life stand-point. The preferred embodiments disclosed in this earlier application include gears that are crashed or drawn into mesh with one another only when the drive shaft is moved to its second location. From a manufacturing point of view, this type of gearing arrangement requires precision engineering to ensure that the gears mesh correctly every time the turret is to be rotated. From a product life point of view, crashing and/or constant engaging and re-engaging of gears leads to wear which can result in reduced product life.

It is therefore an object of the present invention to provide a multiple chuck hand tool, preferably a multiple chuck hand power drill, or a multiple chuck tool attachment for a single chuck hand power drill, including an improved automated chuck exchange system.

DISCLOSURE OF THE INVENTION

According to one aspect of the present invention there is provided a tool including a drive shaft having an axis of rotation, and a plurality of bit holders interchangeable with one another at a position of use, the bit holders being mounted on a turret rotatable around an axis set at an angle to the axis of rotation of the drive shaft, the drive shaft being in drive connection with a respective bit holder at the position of use, wherein the tool includes means for engaging a clutch which activates a drive train to establish a drive connection between the drive shaft and the turret so that subsequent operation of the drive shaft rotates the turret to interchange the positions of the bit holders at the position of use, and wherein after the turret has been rotated the clutch is disengaged to deactivate the drive train to prevent any further rotation of the turret.

BRIEF DESCRIPTION OF THE DRAWINGS

In order that the invention may be more clearly understood and put into practical effect there shall now be described in detail preferred constructions of a multiple chuck hand tool in accordance with the invention. The ensuing description is given by way of non-limitative example only and is with reference to the accompanying drawings, wherein:

FIG. 1b is a right side view of the multiple chuck hand tool shown in FIG. 1a;

FIG. 2b is a right side view of the multiple chuck hand tool shown in FIG. 2a;

FIG. 3b is an enlarged cross-sectional view of the correspondingly marked circled region of the multiple chuck hand tool shown in FIG. 3a;

FIG. 4b is an enlarged cross-sectional view of the correspondingly marked circled region of the multiple chuck hand tool shown in FIG. 4a;

FIG. 5c is an enlarged cross-sectional view of the correspondingly marked circled region of the multiple chuck hand tool shown in FIG. 5a;

FIG. 6b is an enlarged cross-sectional view of the correspondingly marked circled region of the multiple chuck hand tool shown in FIG. 6a;

FIGS. 7a to 7f are various views of a preferred chuck change turret release clutch activation mechanism suitable for use with any one of the multiple chuck hand tools shown in FIGS. 1a to 6b;

MODES FOR CARRYING OUT THE INVENTION

Figure 1A:
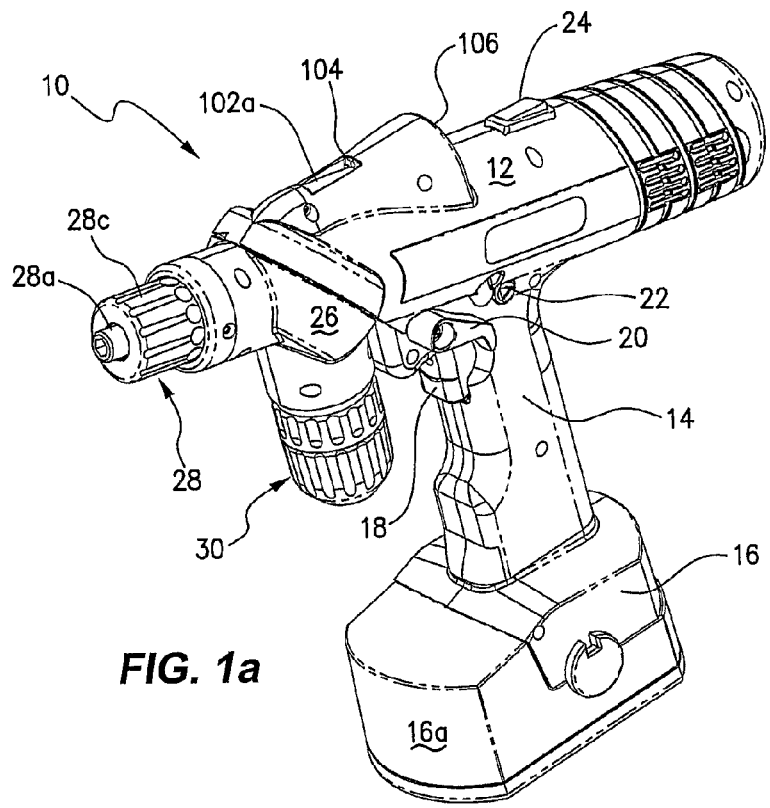
FIG. 1a is a front perspective view of a multiple chuck hand tool made in accordance with a first preferred embodiment of the present invention.

In FIGS. 1a & 1b and 2a & 2b there are shown multiple chuck hand tools 10,100 (hereinafter simply referred to as tools 10,100) of any suitable form, for example electric drills as shown, made in accordance with first (FIGS. 1a & 1b) and second (FIGS. 2a & 2b) preferred embodiments of the present invention. Although shown in the drawings as being electric drills it should be understood that tools 10,100 may be embodied in many other forms (see for example the fourth preferred embodiment shown in FIGS. 10a to 10e) and as such the invention is not limited to the specific examples provided.

In FIGS. 1a to 2b, it can be seen that tools 10,100 are constructed as drills, each having a body casing 12,112 with a pistol grip portion 14,114 that enables a user (not shown) to hold tool 10,100 comfortably with one hand.

Pistol grip portions 14,114 have enlarged bases 16,116 to enable rechargeable batteries 16a,116a to be fitted to tools 10,100 to power same.

Although not shown in the drawings, instead of utilising rechargeable batteries 16a,116a as a power supply means, tools 10,100 may be powered by an AC mains supply or may even be pneumatic or hydro-static drill devices. It should therefore be understood that the present invention is not limited to the specific example described.

Figure 1B:
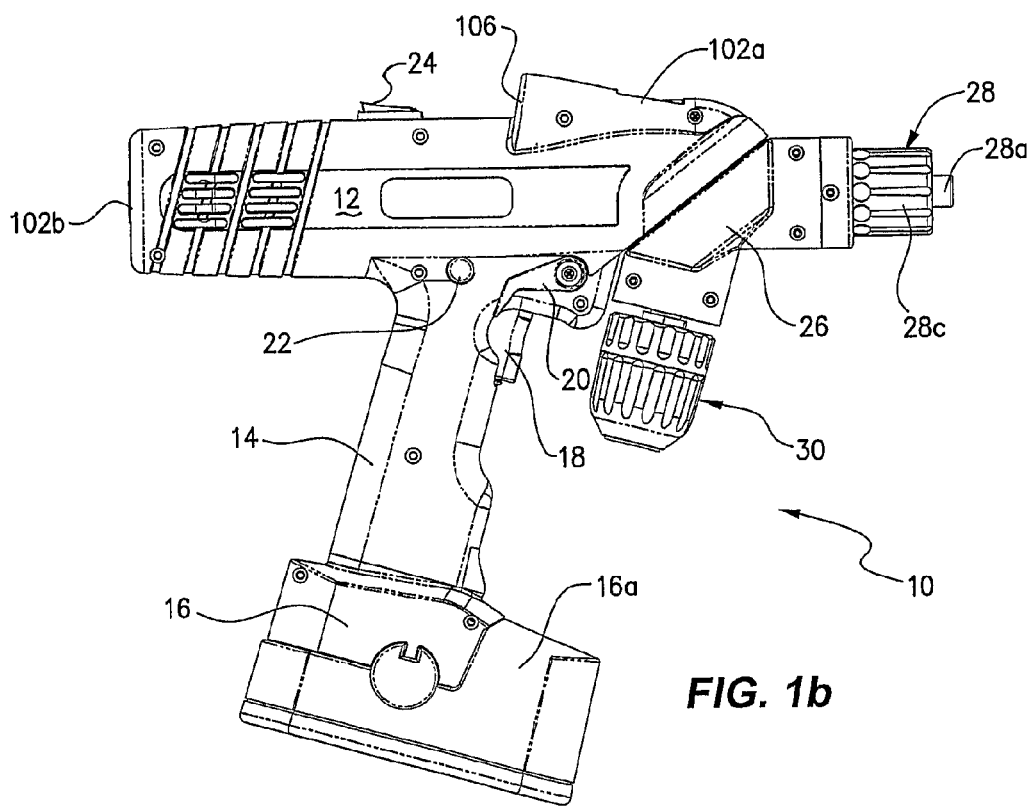
Figure 2A:
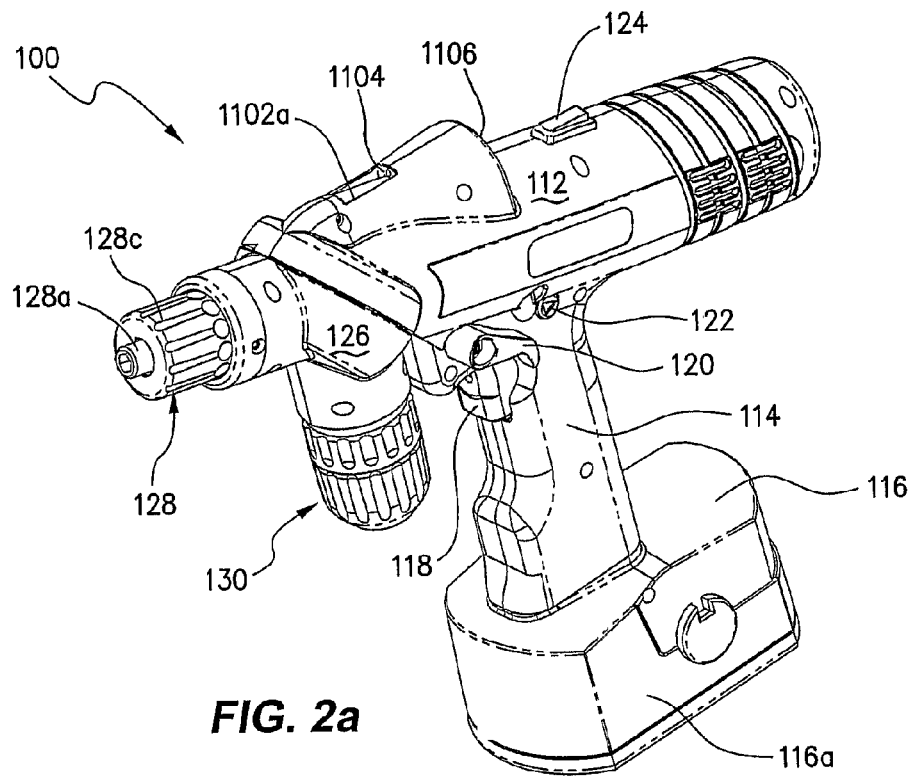
FIG. 2a is a front perspective view of a multiple chuck hand tool made in accordance with a second preferred embodiment of the present invention.
Figure 2B:
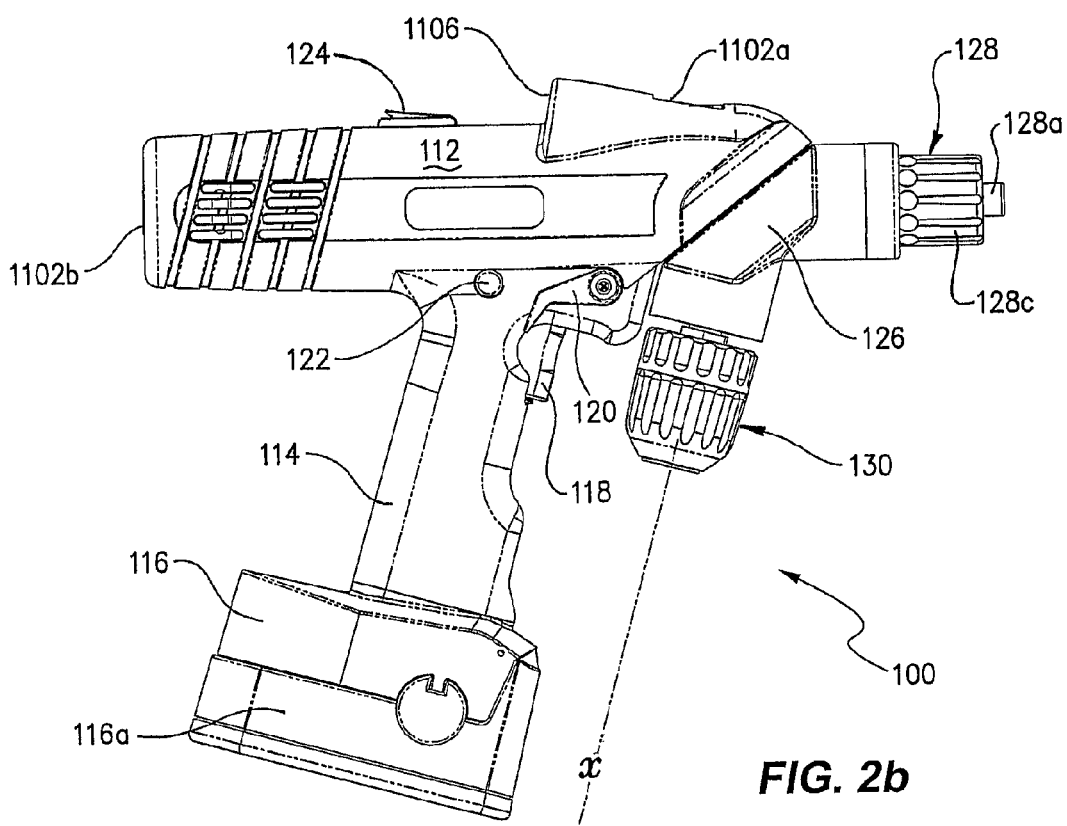

Tool 10 of FIGS. 1a & 1b, varies to that of tool 100 of FIGS. 2a & 2b, only in respect of the positioning of base 16 and battery 16a relative to pistol grip portion 14. More particularly, in FIGS. 1a & 1b it can be seen that the majority of base 16 and battery 16a are disposed forward of pistol grip portion 14 of tool 10, as opposed to being disposed rearward of pistol grip portion 114 in the case of the majority of base 116 and battery 116a of tool 100.

In FIG. 2b it can be seen that by arranging battery 116a toward the rear of tool 100 relative to pistol grip 114, as opposed to forward of pistol grip portion 14 as is shown in FIGS. 1*a* & 1*b*, a long tool bit, such as, for example, a spade bit (not shown), can be fitted to tool 100 without there being a risk of that tool bit colliding with battery 116*a* during operation of tool 100. Line x is provided in FIG. 2*b* to illustrate the additional unhindered area provided by tool 100 when battery 116 is disposed rearward of tool 100 relative to pistol grip 114.

It will be appreciated that the actual positioning of base 16,116, and hence, batteries 16*a*,116*a*, of tools 10,100 is not essential to the present invention, and instead, a person skilled in the art would appreciate a multitude of different arrangements to that shown in the drawings. The present invention should therefore not be construed as limited to the specific examples provided.

Other than the difference between tools 10,100 that has been described above, tools 10,100 are basically identical, and for this reason reference will from now on only be made to tool 10 of FIGS. 1*a* & 1*b*, which will be described in further detail below with reference to FIGS. 3*a* to 8*l*. For ease of reference, in FIGS. 2*a* & 2*b* like reference numerals correspond to like parts shown in FIGS. 1*a* & 1*b*.

In FIGS. 1*a* & 1*b*, in particular, it can be seen that tool 10 may include at least four trigger or switch means 18,20,22,24 (hereinafter simply referred to as "trigger means 18,20,22, or 24") in order to activate various modes of operation of tool 10. A first trigger means 18 is a power ON/OFF switch arranged on pistol grip portion 14 for applying variable power to tool 10 (i.e. depending on trigger travel), a second trigger means 20 is a chuck-change activation means (which may be located on either or both sides of tool 10 should ambidextrous usage of tool 10 be desirable) that is disposed adjacent first trigger means 18, and which initiates the automated chuck exchange process of tool 10, a third trigger means 22 is a forward/reverse switch for altering the drive direction of tool 10 and which is disposed on the upper portion of pistol grip portion 14, and finally, a fourth trigger means 24 is a speed control slide or switch which allows the speed of tool 10 to be altered to suit different working conditions and/or to allow for different tool bits (not shown) to be used at different speeds, as for example, a screw-driver bit which must be used at low speeds as compared to a drill bit which is usually used at much faster speeds. The fourth trigger means 24 is preferably disposed on the upper surface of body casing 12, as shown, but may be disposed at any suitable location on tool 10 depending on the preference of the manufacturer and/or the requirements of the retailer.

Reference will now be made FIGS. 3*a* to 6*b* in order to provide a detailed understanding of the remaining components and operation of tool 10. In these figures, a number of components, such as, for example, battery 16*a* and third and fourth trigger means 22,24, are not shown in some or all of figures to simply the understanding of the drawings.

In FIGS. 3*a* to 6*a*, it can be seen that the forward end of body casing 12 carries a rotatable turret 26 on which are mounted two bit holding chucks 28,30. It should be appreciated that more than two chucks may be provided, if necessary, and as such the invention is not limited to the specific example provided.

Chucks 28,30 have respective axes of rotation i,j (see FIG. 3*a*) and enable different tool bits (not shown), such as, for example a screw-driver bit and a drill bit, to be mounted in respective chucks 28,30.

In the preferred embodiment shown in FIGS. 1*a* & 1*b*, and FIGS. 3*a* to 6*b*, tool 10 includes a first chuck 28 for receipt of screw-driver bits (not shown), and a second chuck 30 for receipt of drill bits (not shown). To enable ease of attachment and detachment of screw-driver bits to/from tool 10, first chuck 28 preferably includes a magnetic retain hex nose piece 28*a* (see particularly, FIGS. 1*a* and 5*a*) which enables screw-driver bits having matched hex shafts to be attached and detached from tool 10 without having to be clamped within a standard-type drill chuck. To facilitate easy placement and removal of drill bits to/from tool 10, second chuck 30 is preferably a key-less drill chuck which can be opened and closed by hand, for example, as power is applied to tool 10 by way of trigger means 18 (and controlled by way of forward/reverse trigger means 22).

Although not shown in the drawings, it is preferred that first chuck 28 (e.g. the screw-driver bit chuck) is clutched, and second chuck 30 (e.g. the drilling chuck) is not clutched. A person skilled in the relevant art will appreciate that drilling applications generally require maximum rotational force, as opposed to screwing applications which are generally performed at much lower speeds. For this reason, first chuck 28 of tool 10 is preferably clutched, and second clutch 30 of tool 10 is preferably un-clutched to achieve this desired result. The clutch arrangement (not shown) of first chuck 28, is preferably operable from a fully locked state (e.g. clutch fully engaged and minimal slip allowed) to a partially locked state (e.g. clutch partially engaged and minimal resistance enables slip). It is further preferred that the degree of the clutch action of first chuck 28 of tool 10 is controllable via an indexed nose piece 28*c* of tool 10.

In an alternative embodiment (not shown), first chuck 28 may include an integral planetary gearbox, instead of a clutch arrangement, to vary the speed of rotation of that chuck 28 to assist with screwing applications. In yet a further alternative preferred embodiment (also not shown), tool 10 may be configured to electronically detect when first chuck 28 is located at the position of use in front of tool 10 so that the speed of rotation of tool 10 could be automatically controlled to regulate the rotational speed of first chuck 28 to assist with screwing applications. A person skilled in the relevant art will appreciate many such variations, and as such, the present invention should not be construed as limited to any of the specific examples provided.

In the case of the embodiment of FIGS. 1*a* & 1*b*, and FIGS. 3*a* to 6*b*, if first and second chucks 28,30 of tool 10 are each required to perform a drilling action, e.g. one to drill a hole and the other to countersink that hole, etc, a spare drilling chuck (keyless or non-keyless) may be provided for click-insertion into the magnetic retain hex nose piece 28*a* of first chuck 28. In this way, tool 10 could be used as a multiple chuck drilling device.

It will be appreciated that any suitable arrangement and type of chucks 28,30 can be used with tool 10 of the present invention. Hence, although the first chuck 28 has been shown and described as being a screw-driver bit chuck, and the second chuck 30 has been shown and described as being a drilling chuck, these chucks 28,30 could be alternatively arranged if need be, and as such, any reference to the terms 'first' and 'second' chucks is not intended to imply any preferred order or arrangement of the chucks of tool 10,100. Accordingly, the present invention should not be construed as limited to the specific examples provided.

In the cross-sectional views of FIGS. 3*a* to 6*b*, it can be seen that within body casing 12, tool 10 contains an electric motor 32 powered by battery 16*a* of tool 10 by way of ON/OFF trigger means 18, and a planetary reduction gear box 34 controlled by speed-control trigger means 24 (see FIGS. 1*a* & 1*b*) and which transmits the drive of motor 32 to a drive shaft 36.

As is shown particularly in FIGS. 3b & 4b, in the case of the preferred embodiment of tool 10 shown in these drawings, drive shaft 36 is preferably axially reciprocal between two, axially-spaced positions by a chuck change turret release clutch activation mechanism (hereinafter simply referred to as "CCTRCAM 20x") which is selectively operable by way of second trigger means 20.

Chucks 28,30 are rotatably mounted on turret 26 so that their axes i,j are set at any suitable angle to one another, for example, around 105°, as shown. Chucks 28,30 have central rear hex connecting shafts 38,40 that are received within a complementary shaped plug formation 42 (see, for example, FIG. 8b) formed on the forward end of drive shaft 36 during movement of drive shaft 36 to a first or engaged position (see for example FIG. 3b). In this way (referring particularly to the position of chuck 28 in FIGS. 3a & 3b) the plug formation 42 of drive shaft 36 can be mated with the central rear hex connecting shaft 38 of chuck 28 so that any rotational drive applied to drive shaft 36 is transferred to chuck 28 at the forward end of drill 10.

Figure 4A:
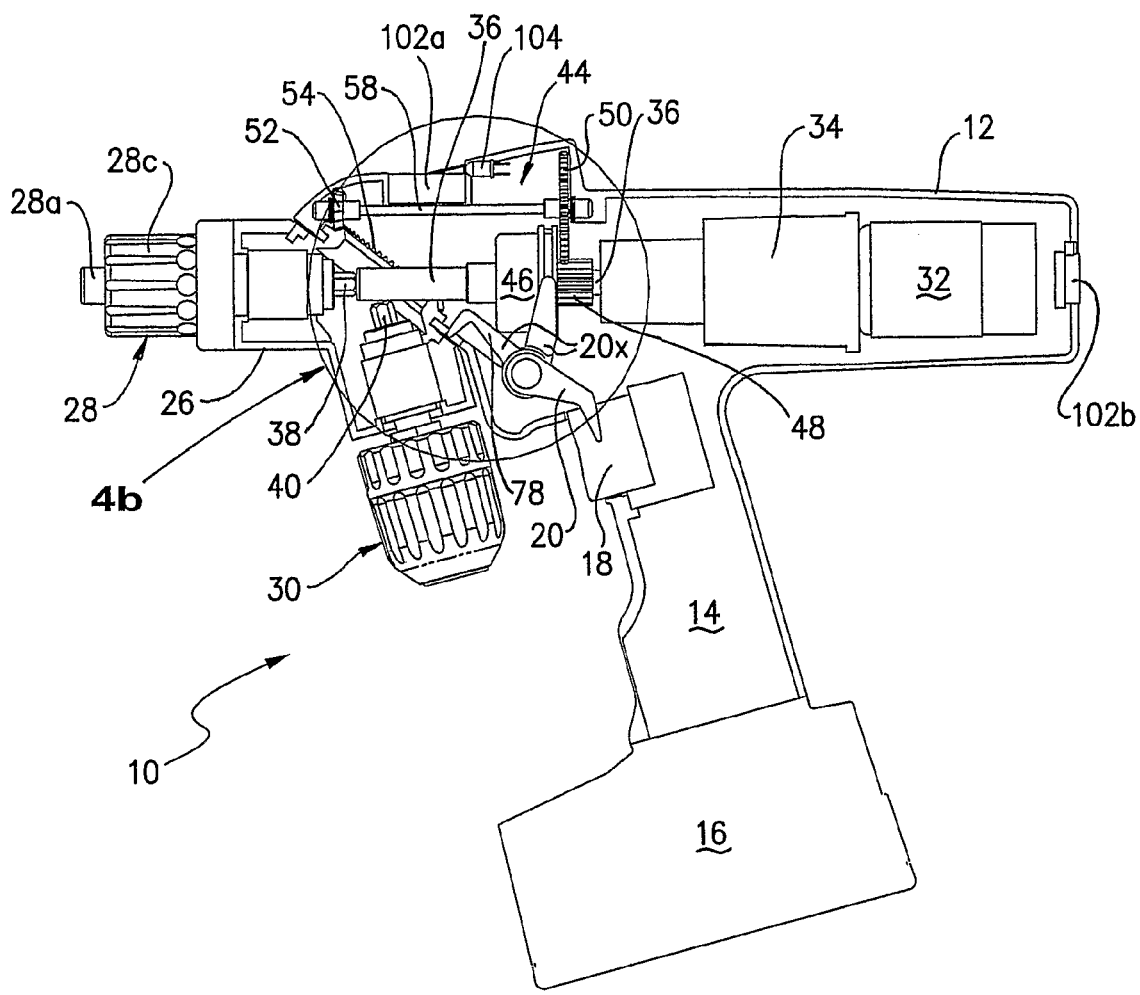
FIG. 4a is a similar view to that of FIG. 3a, this time showing a first stage of a preferred automated process for interchanging the positions of the first and a second chuck of the tool.
Figure 4B:
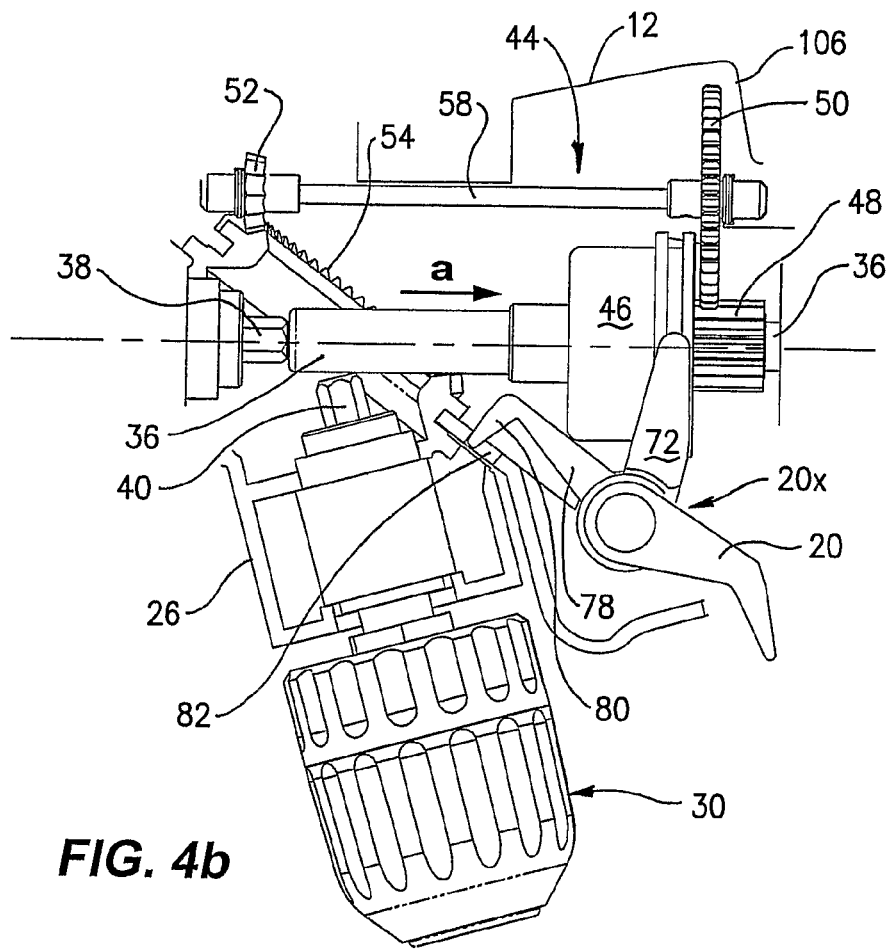
Figure 4C:
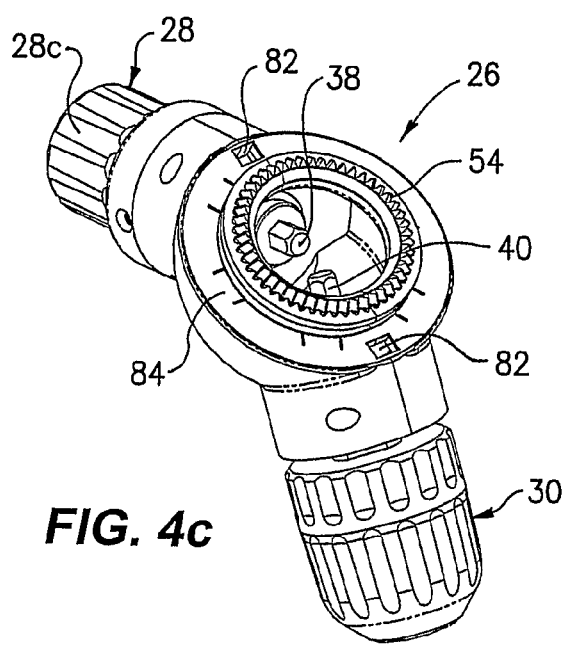
FIG. 4c is a perspective view from above of the turret section of the multiple chuck hand tool shown in FIGS. 1a, 1b, and 3a to 4b.
Figure 5A:
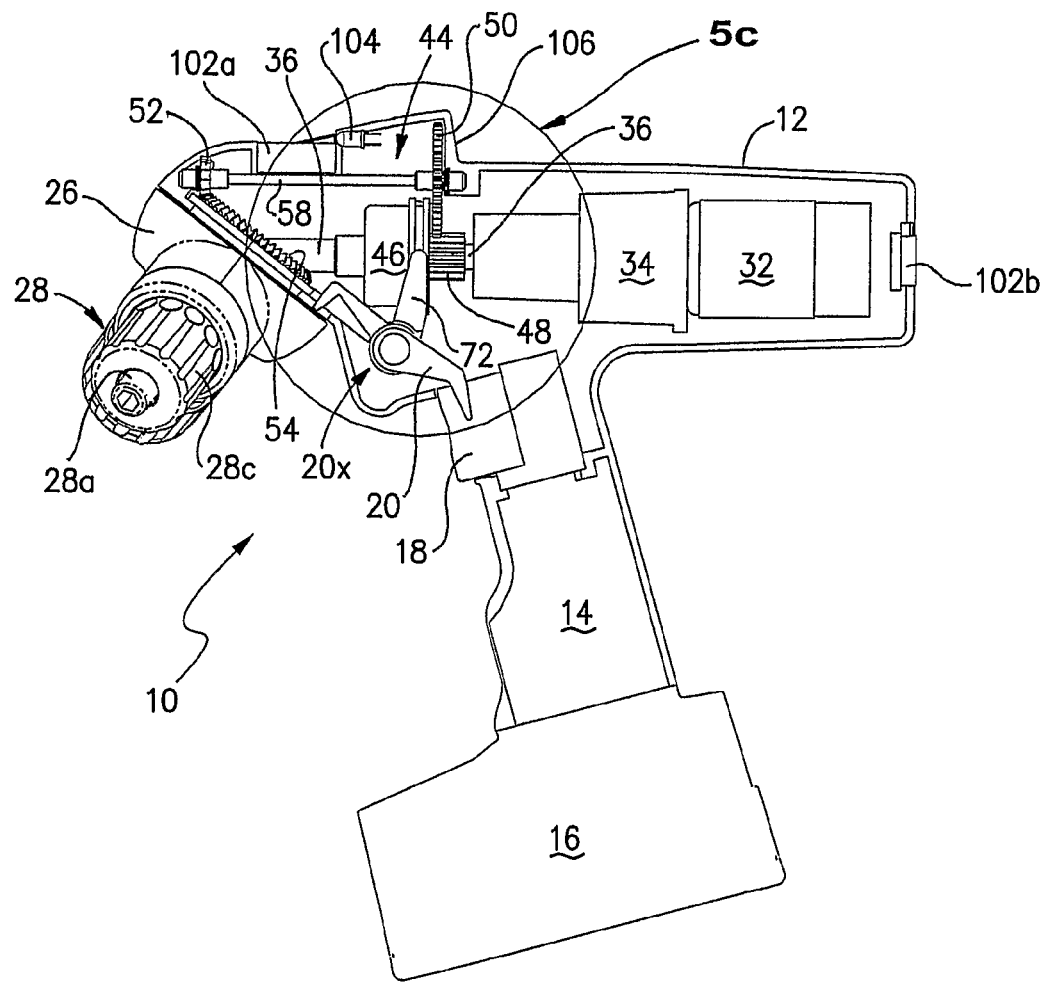
FIG. 5a is a similar view to that of FIGS. 3a & 4a, this time showing a further stage of the preferred automated process for interchanging the positions of the first and second chucks of the tool.
Figure 5B:
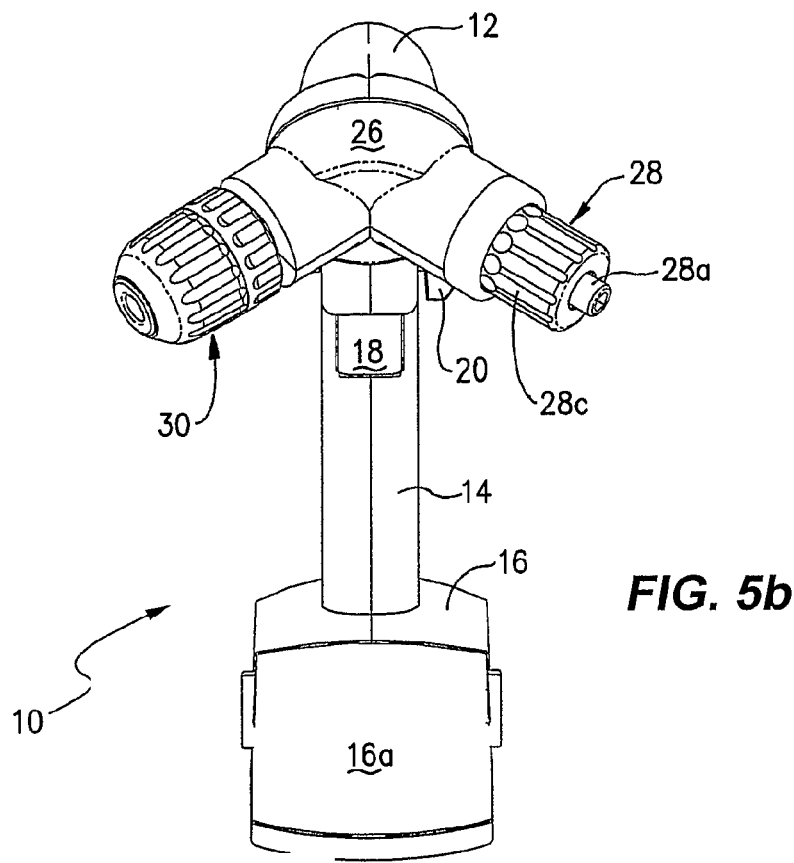
FIG. 5b is a front view of the multiple chuck hand tool shown in FIG. 5a; showing the position of the first and second chucks approximately mid-way through the preferred automated chuck change process.
Figure 5C:
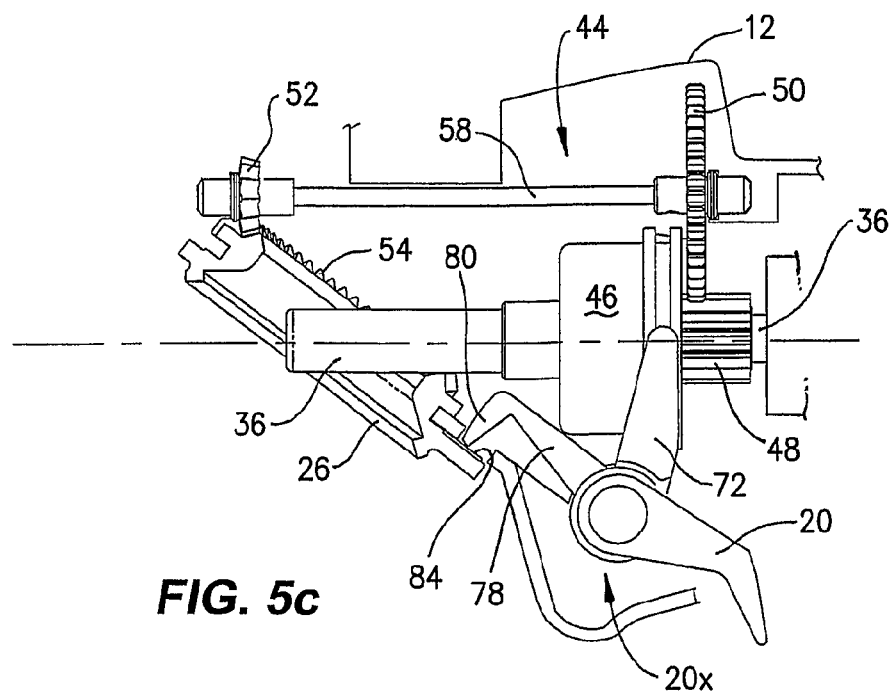

Turret 26 is so mounted that it can be rotated about an axis k after the plug formation 42 of drive shaft 36 has been withdrawn from a hex connecting shaft 38 or 40 of a chuck 28 or 30, to its second or disengaged position (of FIGS. 4a & 4b). Axis k is preferably set at an angle of around 45° to the axis of drive shaft 36 as shown in the drawings, but may be set at any suitable angle, and both axes preferably lie in the same plane as the longitudinal axis of pistol grip portion 14.

Rotation of turret 26 is carried out to interchange the positions of chucks 28,30 by the operation of a layshaft gear train 44 which is non-functioning until such time that a CCTRCAM 20x engages a clutch mechanism 46 which sets layshaft gear train 44 into motion. Layshaft gear train 44, and various preferred clutch mechanisms 46,146, and CCTRCAM's 20x, 120x will now be described in further detail with reference to FIGS. 3a to 8l.

In FIGS. 3a to 6b it can seen that layshaft gear train 44 is a gear train which is preferably in constant mesh with drive shaft 36 and turret 26 such that there is no crashing of any of the gears 48,50,52,54 of layshaft gear train 44 upon engagement of clutch mechanism 46 when drive shaft 36 is moved to its second location by way of CCTRCAM 20x (upon activation of second trigger means 20).

In the embodiment shown in FIGS. 8a to 8e, it can be seen that clutch mechanism 46 preferably includes a clutch housing 56 that includes an integral first gear 48 which is in constant mesh with a cooperating layshaft drive gear 50 that is disposed on one end of a layshaft 58. Disposed at the other end of layshaft 58 is a turret drive gear 52 which is in constant mesh with a turret rotation gear 54 that is affixed to, or is integral with, turret 26 of tool 10. In the embodiment shown in FIGS. 3a to 8e, the layshaft 58 mounted turret drive gear 52 is a bevel gear pinion which is coupled to, and preferably in constant mesh with, the turret 26 mounted turret rotation gear 54 which is preferably a bevel crown gear as shown.

Figure 3A:
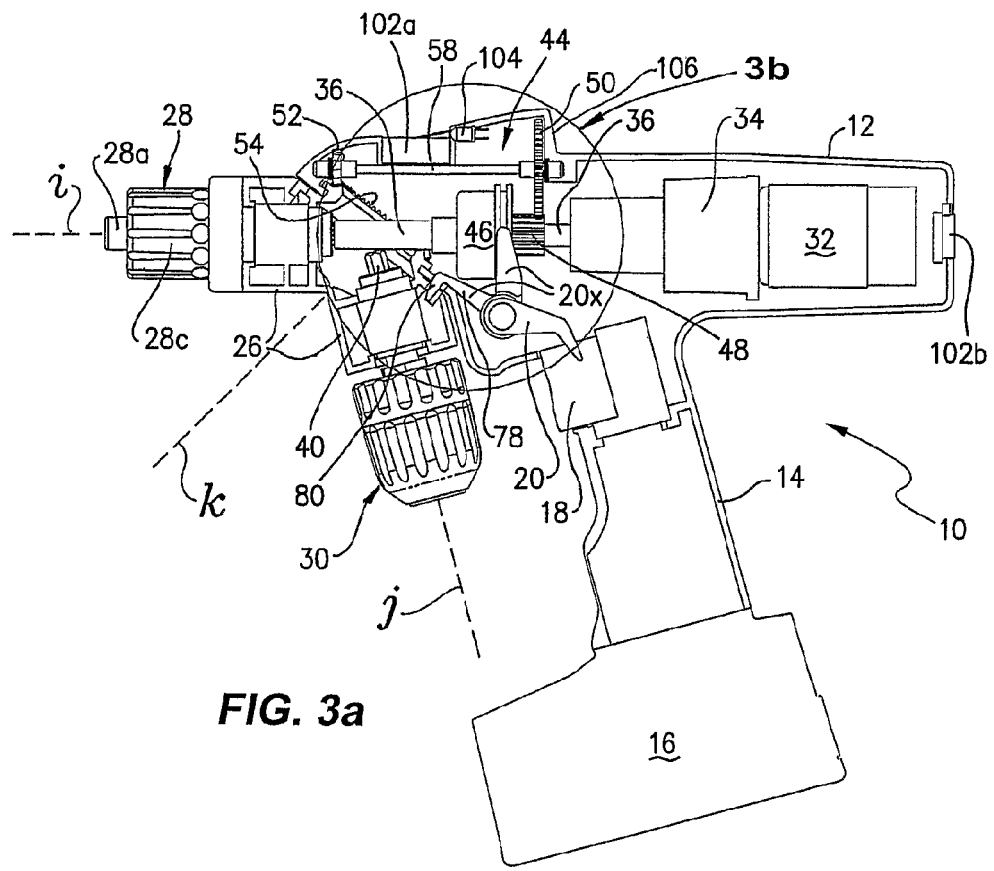
FIG. 3a is a cross-sectional left side view of the multiple chuck hand tool shown in FIGS. 1a & 1b, shown having a first chuck stationed at a position of use in front of the tool.
Figure 3B:
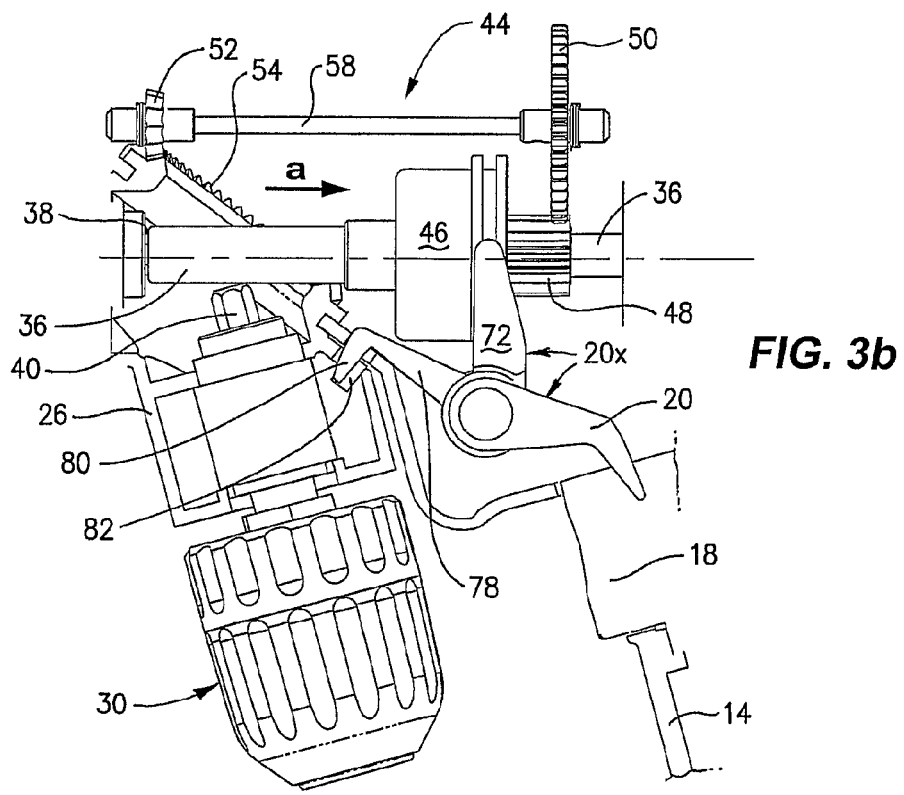

In FIGS. 8a to 8e, it can be seen that clutch mechanism 46 is axially aligned with drive shaft 36, having drive shaft 36 passing therethrough such that drive shaft 36 can establish a drive connection with a chuck 28,30 at the position of use when drive shaft 36 is in its first location (see, for example, FIG. 3b).

Figure 8A:
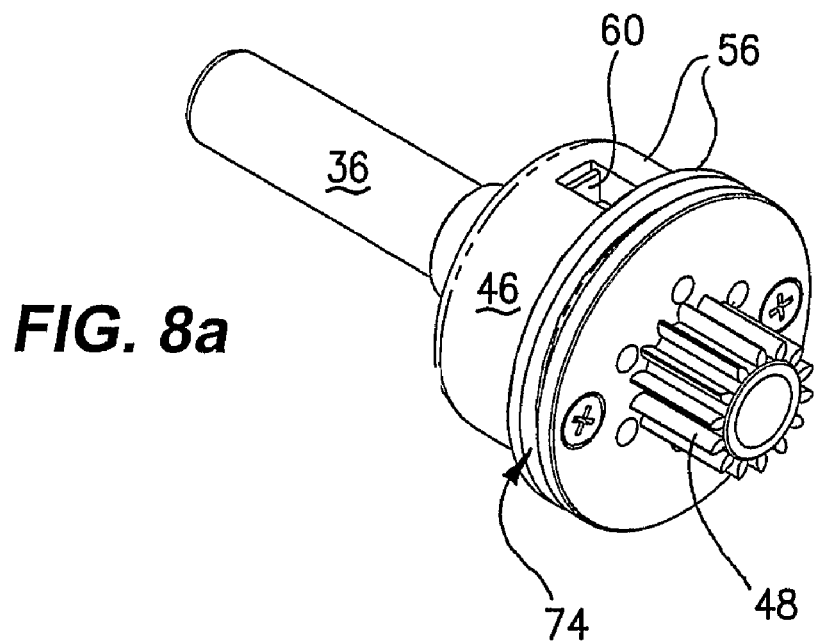
FIGS. 8a to 8e are various views of a preferred clutch mechanism suitable for use with any one of the multiple chuck hand tools shown in FIGS. 1a to 6b.
Figure 8B:
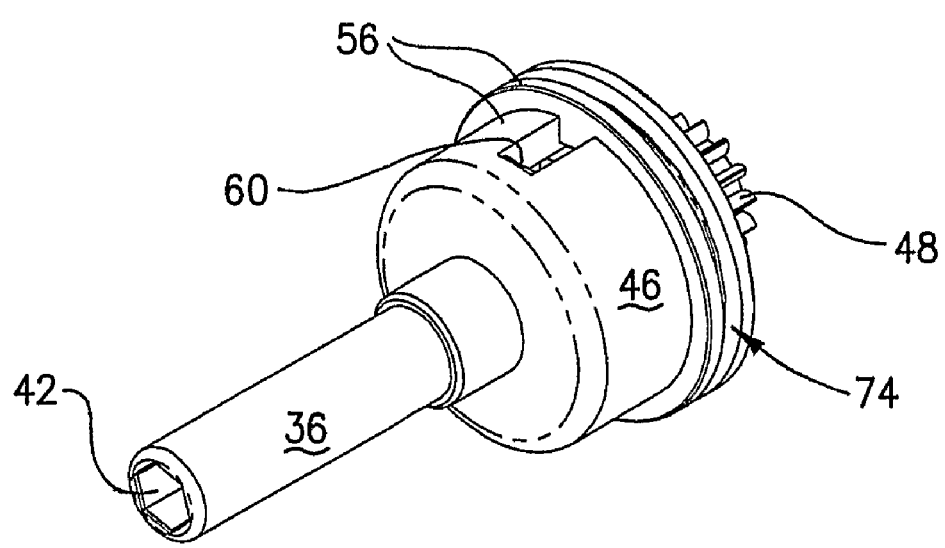
Figure 8C:
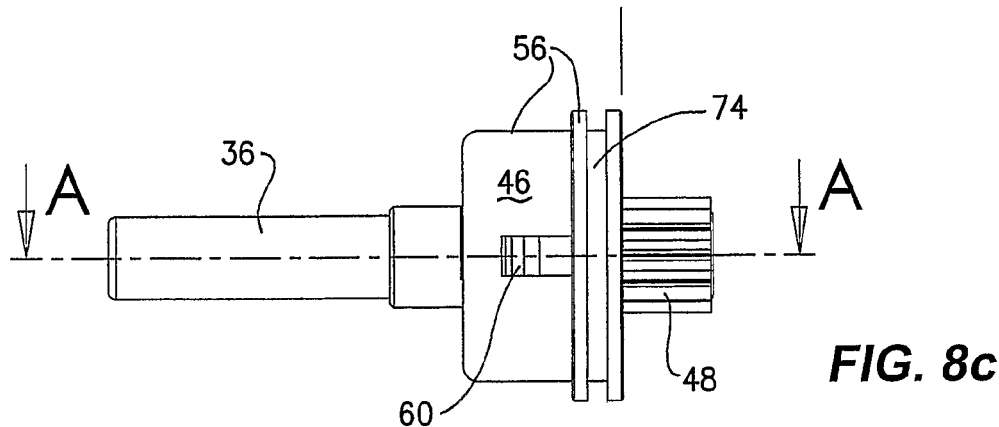
Figure 8D:
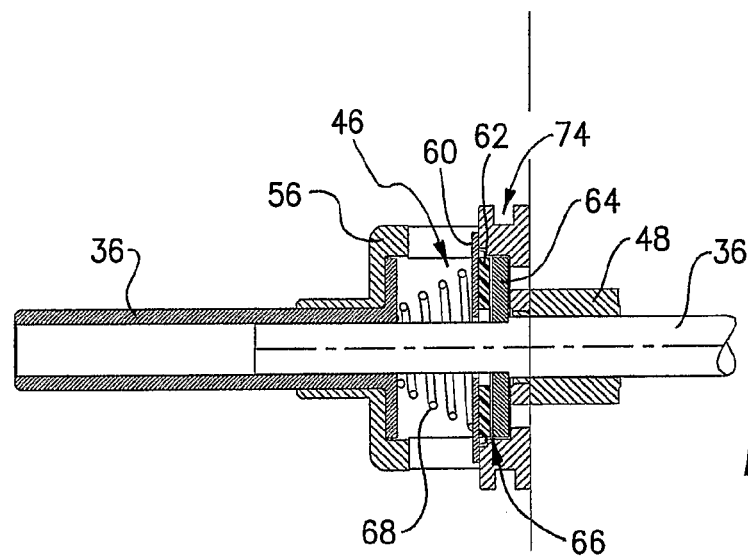
Figure 8E:
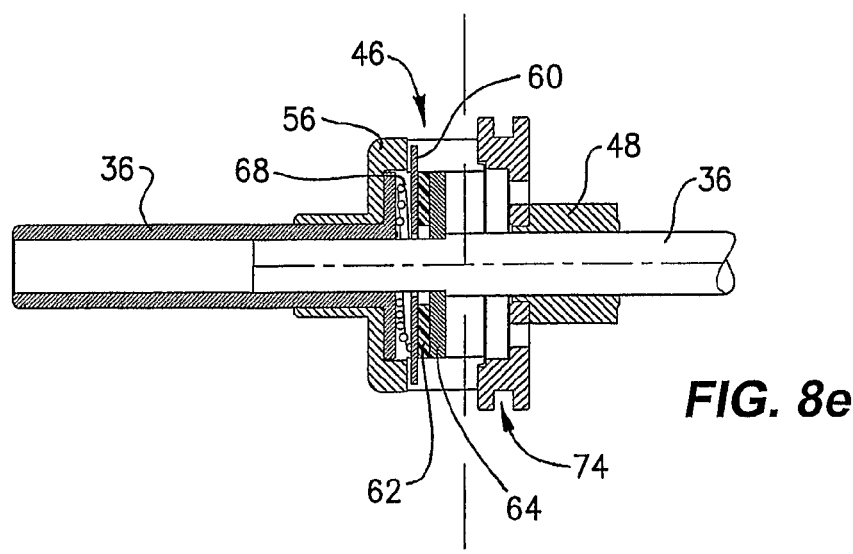

In the cross-sectional views of FIGS. 8d & 8e, it can be seen that clutch housing 56, and integral layshaft gear train (44) gear 48, of clutch mechanism 46 are non-functioning (i.e. they slip or free wheel relative to drive shaft 36) until such time that clutch mechanism 46 is engaged by way of drive shaft 36 being moved to its second location by CCTRCAM 20x.

Referring again to FIGS. 8a to 8e, it can be seen that preferred clutch mechanism 46 includes a clutch plate 60 having a frictional surface 62 disposed thereon, which when clutch mechanism 46 is engaged by way of CCTRCAM 20x, is pressed against a rotating disc 64 that then allows clutch housing 56, and hence, integral layshaft gear train (44) gear 48, to rotate. In FIG. 8d, it can be seen that when clutch mechanism 46 is disengaged, a very small gap 66 exists between frictional surface 62, of clutch plate 60, and rotating disc 64. This gap 66 allows clutch housing 56, and gear 48, to slip or free wheel relative to drive shaft 36, and hence, allows layshaft gear train 44 to remain in constant mesh with drive shaft 36 and turret 26 at all times.

In FIG. 8e, it can be seen that as clutch mechanism 46 is engaged by way of CCTRCAM 20x, frictional surface 62, of clutch plate 60, is forced against rotating disc 64 which in turn initiates rotation of clutch housing 56, and hence, integral gear 48.

To assist with the movement of drive shaft 36 back to its first position upon a change in position of chucks 28,30, clutch mechanism 46 includes a spring 68 which acts against clutch housing 56 and clutch plate 60.

Referring particularly to FIGS. 7a to 7f, it can be seen that in order to reciprocate drive shaft 36 between its first (FIGS. 3a & 3b) and second (FIGS. 4a & 4b) locations, the first preferred CCTRCAM 20x includes a number of integral components each of which perform various functions to enable the chucks 28,30 of tool 10 to be automatically exchanged.

In FIGS. 7a to 7f, second trigger means 20 is not shown for illustrative purposes only. It will be appreciated that second trigger means 20 can be affixed to a CCTRCAM 20x by way of any suitable coupling means, for example, square connecting sockets 70, as shown. Similarly, although not shown in the drawings, it will be appreciated that second trigger means could be an integral part of a CCTRCAM 20x.

It can be seen in FIGS. 7a to 7f, that CCTRCAM 20x is configured to pivot on an axis m (see FIG. 7d) as force is applied to second trigger means 20 by way of a users (not shown) thumb or finger(s). This pivot action applied to CCTRCAM 20x, by way of second trigger means 20, mechanically moves drive shaft 36 to its second location in the direction of arrow a (see FIGS. 3b & 4b) by way of an integral yoke means 72.

In FIGS. 3a to 6b, it can be seen that yoke means 72 is preferably coupled to clutch housing 56 by way of a peripheral groove 74 formed in clutch housing 56 which receives a pair of yoke mounted studs 76. By this arrangement, yoke means 72 is able to force drive shaft 36 to its second location (FIG. 4b) in the direction of arrow a (and against the action of clutch mechanism spring 68) as force is selectively applied to second trigger means 20 by a user of tool 10. This same action engages clutch mechanism 46 which in turn, activates layshaft gear train 44 that then allows turret 26 to rotate to interchange the positions of chucks 28,30.

To: ensure the correct alignment of chucks 28,30 relative to drive shaft 36; to lock turret 26 in place after chucks 28,30 have been interchanged; and, to hold drive shaft 36 in its second location during rotation of turret 26; CCTRCAM 20x also includes a pawl means 78 that has a beak 80 that slots into a respective one of a pair of notches 82 (see particularly FIG. 4c) disposed on turret 26, adjacent turret rotation gear 54 of layshaft gear train 44. Each notch 82 corresponds to an alignment position of turret 26 such that when beak 80, of pawl means 78, is slotted into a notch 82, turret 26 is locked in place to ensure the correct alignment of a chuck 28,30 at the position of use in front of tool 10.

As can be seen in FIGS. 4a to 6b, upon engagement of CCTRCAM 20x, by way of second trigger means 20, beak 80 of pawl means 78 is removed from a first notch 82 which allows turret 26 to rotate through an angle (by way of layshaft gear train 44 which is then active due to engagement of clutch mechanism 46) until such time that beak 80 of pawl means 78 slips into a second notch 82 which eliminates any further rotation of turret 26. During rotation of turret 26, after being removed from a notch 82, beak 80 of pawl means 78 runs along the surface 84 of turret 26 which prevents CCTRCAM 20x from disengaging as CCTRCAM 20x (and hence, drive shaft 36) cannot return to its rest or first position (FIG. 3b). Upon beak 80, of pawl means 78, slipping into a notch 82 after rotation of turret 26, CCTRCAM 20x is automatically disengaged with the assistance of clutch mechanism spring 68. A further CCTRCAM return spring 68a (see FIG. 7a) may also be provided on CCTRCAM 20x to assist with the disengagement of CCTRCAM 20x.

Although not shown in FIGS. 3a to 6b, CCTRCAM 20x may also include an escapement means 86, of any suitable form, to relieve any unnecessary force that may be applied to second trigger means 20 when a user (not shown) selectively chooses to interchange the positions of chucks 28,30, by way of CCTRCAM 20x. One preferred escapement means 86, suitable for use with CCTRCAM 20x, is shown in FIGS. 7a to 7f.

Figure 7D:
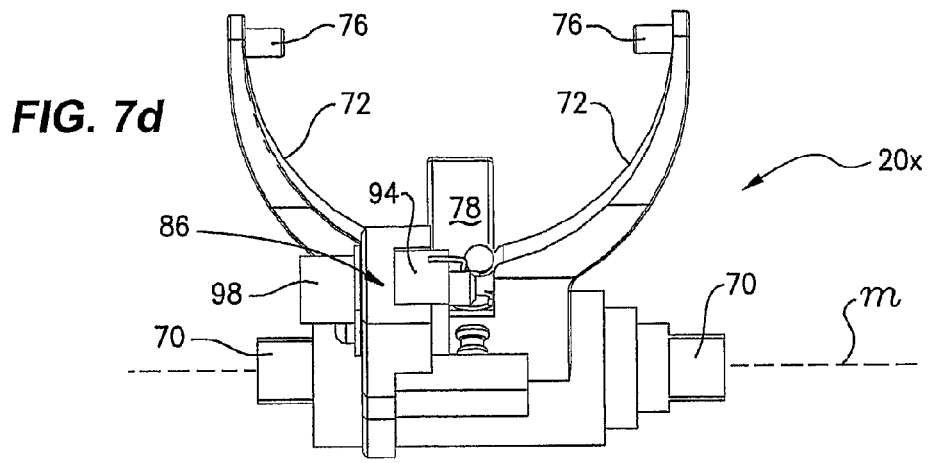
Figure 7E:
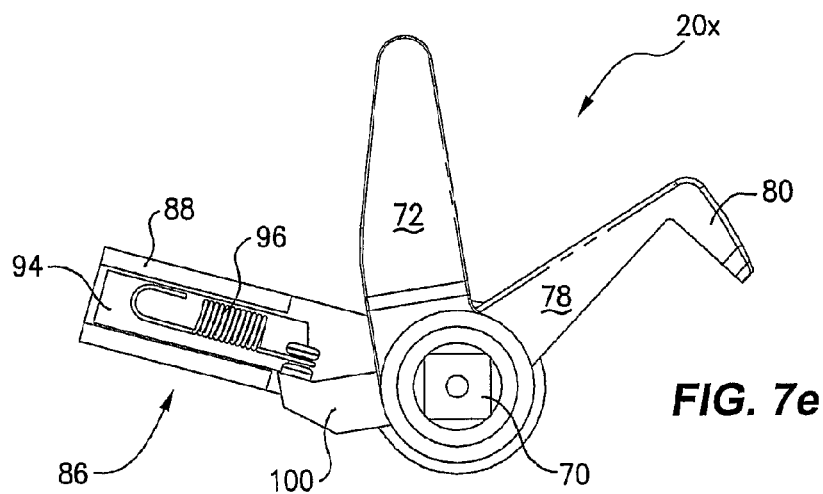
Figure 7F:
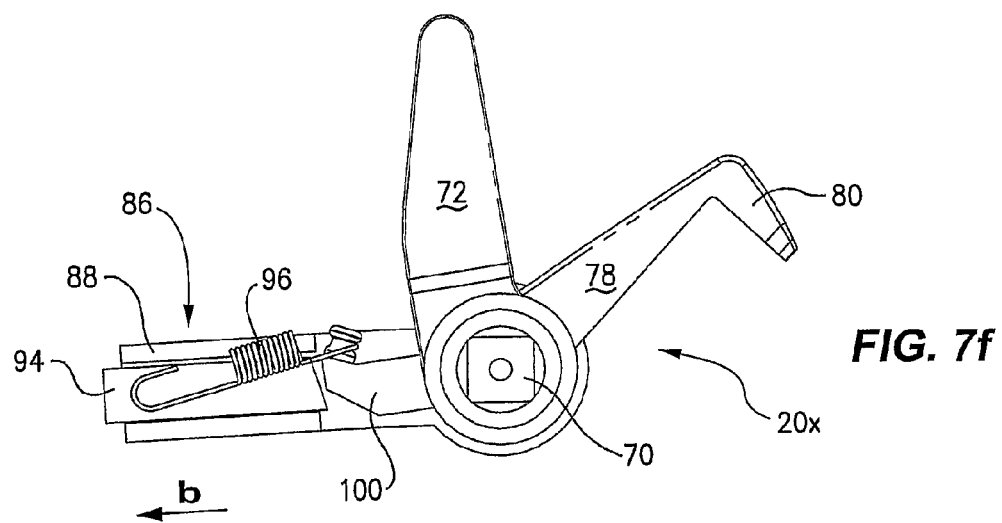

Referring particularly to FIGS. 7e & 7f, it can be seen that escapement means 86 includes an elongated arm 88 which is affixed to, or integral with a pivot pin 90 of CCTRCAM 20x, such that arm 88 moves with pivot pin 90 as CCTRCAM 20x pivots by way of second trigger means 20. Arm 88 defines an inner sliding surface 92 which receives a sliding block mechanism 94 that is biased toward pivot pin 90 of CCTRCAM 20x by way of an escapement spring 96. Sliding block mechanism 94 includes a shaft 98 which is received within a cam surface (not shown) provided on the internal surface of the tool casing. This cam surface guides shaft 98 within sliding surface 92 of arm 88, such that when excess force is applied to CCTRCAM 20x, sliding block mechanism 94 is pulled away from pivot pin 90 of CCTRCAM 20x in the direction of arrow b (see FIG. 7f), against the bias of escapement spring 96. This movement of sliding block mechanism 94 in the direction of arrow b allows arm 88 to slip past a shoulder 100 that is normally engaged with sliding block mechanism 94, and hence, any further force applied to CCTRCAM 20x by way of second trigger mechanism 20, cannot impact any further rotational force to CCTRCAM 20x (i.e. arm 88 of escapement means 86, which is fixed to pivot pin 90, and hence, rotates therewith, can no longer pivot CCTRCAM 20x relative to axis m, as arm 88 can no longer act upon shoulder 100).

Escapement means 86 is designed to reset itself upon disengagement of CCTRCAM 20x when beak 80, of pawl means 78, slips into a notch 82 after rotation of turret 26. Escapement spring 96, and the cam surface (not shown) disposed on the internal casing of tool 10, ensure that escapement means 86 is automatically reset after CCTRCAM 20x is disengaged.

In FIGS. 8f to 8l, there is shown a further (alternative) preferred CCTRCAM 120x, and an alternative preferred clutch mechanism 146 that are both also suitable for use with any one of the multiple chuck hand tools shown in FIGS. 1a to 6b. In FIGS. 8f to 8l, like reference numerals correspond to like parts shown in FIGS. 7a to 8e.

CCTRCAM 120x and clutch mechanism 146 of FIGS. 8f to 8l vary to that of CCTRCAM 20x and clutch mechanism 46 of FIGS. 7a to 8e in a number of distinct ways. More particularly, in FIGS. 8f to 8l it can be seen that CCTRCAM 120x is designed such that the majority of its escapement means (186) components are housed within the second trigger means 120 itself, and hence, are not located within tool 10 when same is fully assembled. In the case of alternative clutch mechanism 146, in FIG. 8h it can be seen that same does not include a clutch housing, and instead the yoke means 172 of CCTRCAM 120x simply acts directly against the clutch plate 160 itself. For this reason, no yoke mounted studs are required on CCTRCAM 120x in order to impart force to clutch mechanism 146. Other than the removal of the clutch housing, alternative clutch mechanism 146 of FIG. 8h operates in essentially the same manner as that of clutch mechanism 46 shown in FIGS. 8a to 8e, and for this reason a further detailed discussion of same is not required.

Figure 8F:
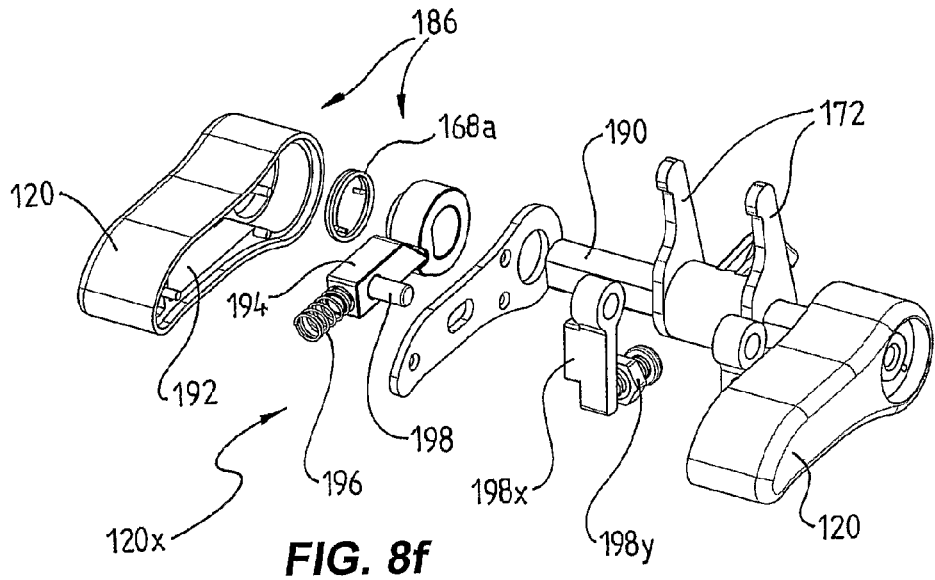
FIGS. 8f to 8l are various views of a further preferred chuck change turret release clutch activation mechanism that is also suitable for use with any one of the multiple chuck hand tools shown in FIGS. 1a to 6b, the clutch mechanism shown in FIG. 8h being made in accordance with a further preferred embodiment and being different to that of the clutch mechanism shown in FIGS. 8a to 8e.
Figure 8G:
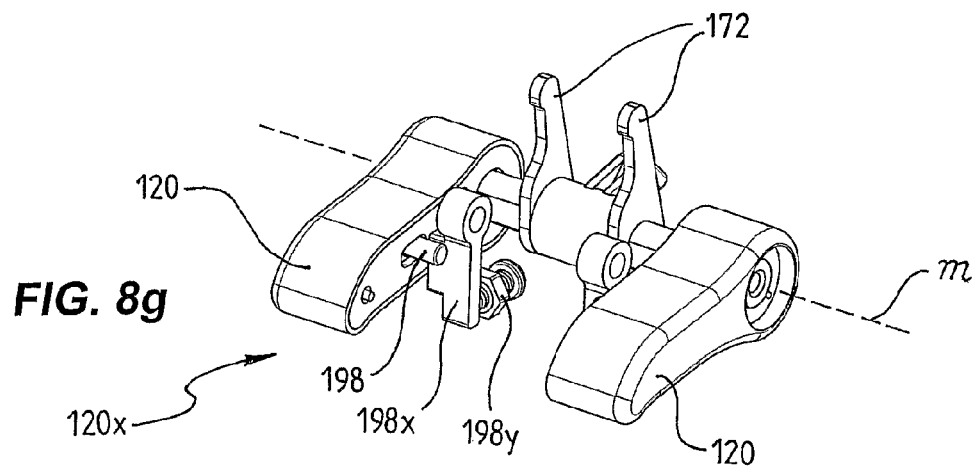
Figure 8H:
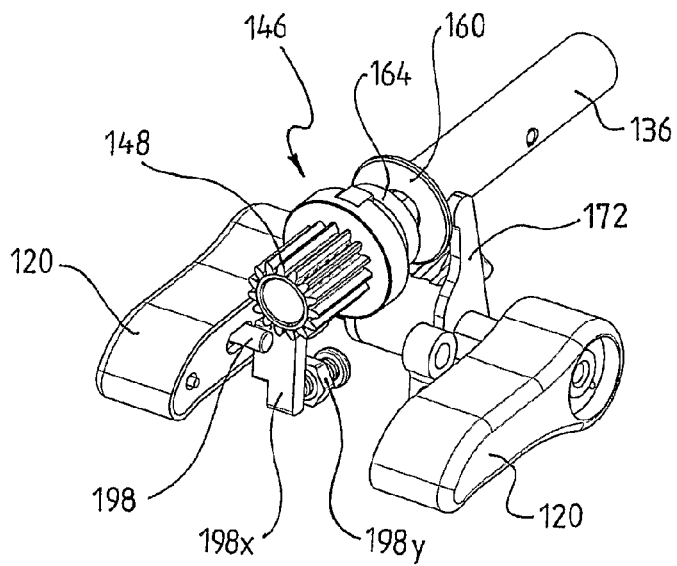
Figure 8I:
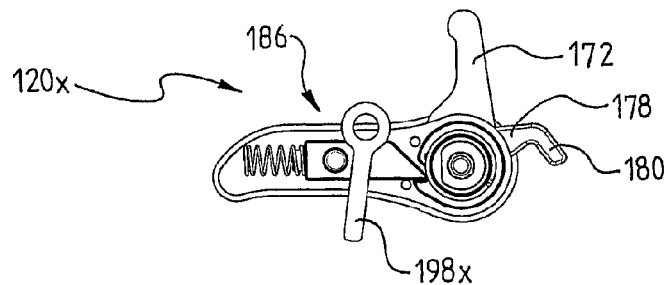
Figure 8J:
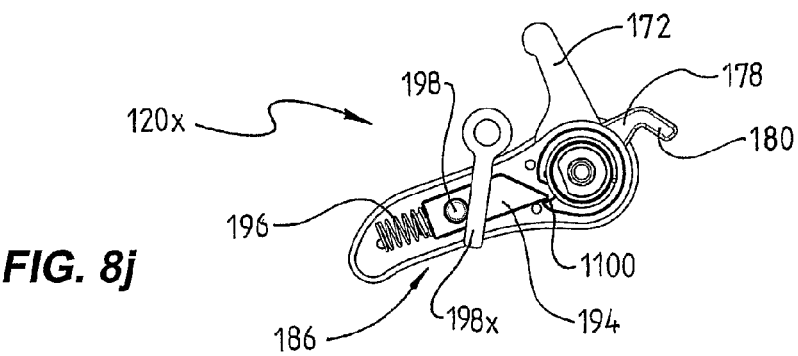
Figure 8K:
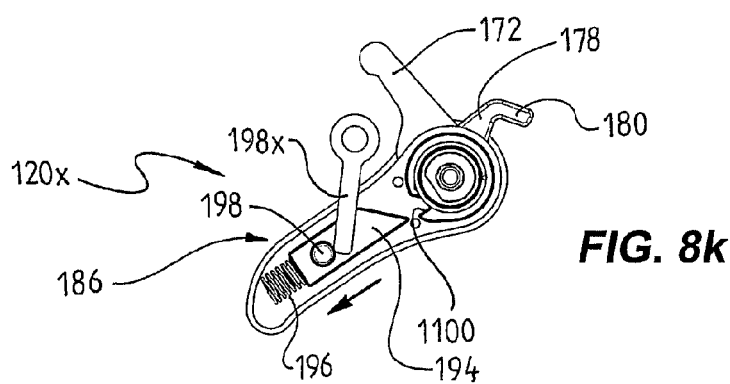
Figure 8L:
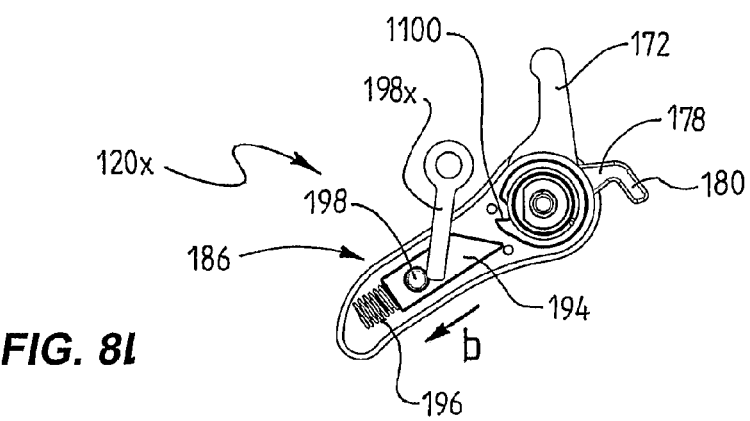

In terms of alternative CCTRCAM 120x, referring particularly to FIG. 8f, it can be seen that its sliding block mechanism 194 is received within an inner sliding surface 192 that is provided within second trigger means 120. Hence, second trigger means 120 also acts as the escapement means arm (i.e. arm 88 of escapement means 86 of FIGS. 7a to 7f) which is only able to impact rotational force to CCTRCAM 120x whilst sliding block mechanism 194 is acting on shoulder 1100. To actuate the escapement means 186 of CCTRCAM 120x, a shaft cam 198 of sliding block mechanism 194 acts against a cam surface 198x (that is adjustable by way of adjustable means 198y) which draws sliding block mechanism 194 away from (and over) shoulder 1100 at the appropriate time.

FIGS. 8i to 8l illustrate the way in which escapement means 186 of CCTRCAM 120x operates in a similar manner to that of escapement means 86 of CCTRCAM 20x shown in FIGS. 7a to 7f.

It will be appreciated that an escapement means 86,186 is only a preferred feature of the present invention and same is therefore not essential to the operation of tool 10 of the present invention. Similarly, a person skilled in the art would appreciate many variations of escapement means that could also be used in accordance with the present invention. Hence, any suitable escapement means that prevents unnecessary rotational force being applied to second trigger means 20,120 when a user (not shown) selectively chooses to interchange the positions of chucks 28,30, by way of CCTRCAM 20x, 120x, could be used in accordance with the invention. The present invention should therefore not be construed as limited to the specific example provided.

Use of tool 10 and the selective automated rotation of turret 26 in response to activation of second trigger means 20 will now be described in more detail with particular reference to FIGS. 3a to 6b.

When drive shaft 36 is engaged with hex connecting shaft 38 of chuck 28 (as shown in FIGS. 3a & 3b), tool 10 can be used to perform any suitable screwing application (with chuck 28 and a corresponding tool bit—not shown), which can be carried out with a single hand of a user, by the selective operation of first trigger means 18. Hence, the operation of tool 10 can be performed, if necessary, while the user is standing on a ladder which is being held with his/her other hand. The operation of first trigger means 18 (i.e. ON/OFF switch) completes an electrical circuit (not shown) between the battery 16a (not shown in FIGS. 3a to 6b) and motor 32 that provides an output drive which is transferred by way of gearbox 34 to drive shaft 36. Drive shaft 36 rotates at a speed determined by the depth of the squeeze applied to first trigger means 18.

The positions of chucks 28,30 (and corresponding tool bits—not shown) can be selectively interchanged when necessary by activating second trigger means 20 whilst either: simultaneously pressing first trigger means 18; or, after activating second trigger means 20, then pressing first trigger means 18. In either scenario, first trigger means 18 must be engaged at some stage in order to apply a rotational force to drive shaft 36 which is needed to drive layshaft gear train 44, which in turn, rotates turret 26.

When second trigger means 20 is engaged, CCTRCAM 20x (or CCTRCAM 120x of FIGS. 8f to 8l) reciprocates drive shaft 36 from its first or engaged position (FIGS. 3a & 3b), in the direction of arrow a, to its second or disengaged position (FIGS. 4a & 4b) at which time plug formation 42 disposed at the forward end of drive shaft 36 is withdrawn from hex connecting shaft 38 of chuck 28. When drive shaft 36 is fully moved to its disengaged position, CCTRCAM 20x simultaneously withdraws beak 80 of pawl means 78 out of first notch 82, and engages clutch mechanism 46 (or clutch mechanism 146 shown in FIG. 8h in the case of CCTRCAM 120x of FIGS. 8f to 8l). The engagement of clutch mechanism 46 at this point, activates layshaft gear train 44, which then rotates turret 26 through an angle of, for example, around 180°, as drive shaft 36 is selectively operated by way of first trigger means 18. Upon completing the full rotation required (see FIGS. 5a to 5c for a view of chucks 28,30 at a point that is approximately mid-way through the chuck change procedure) to interchange chuck 30 with chuck 28, beak 80 of pawl means 78 slips into second notch 82 which automatically disengages CCTRCAM 20x, and hence, clutch mechanism 46—which eliminates any further rotation of turret 26.

Figure 6A:
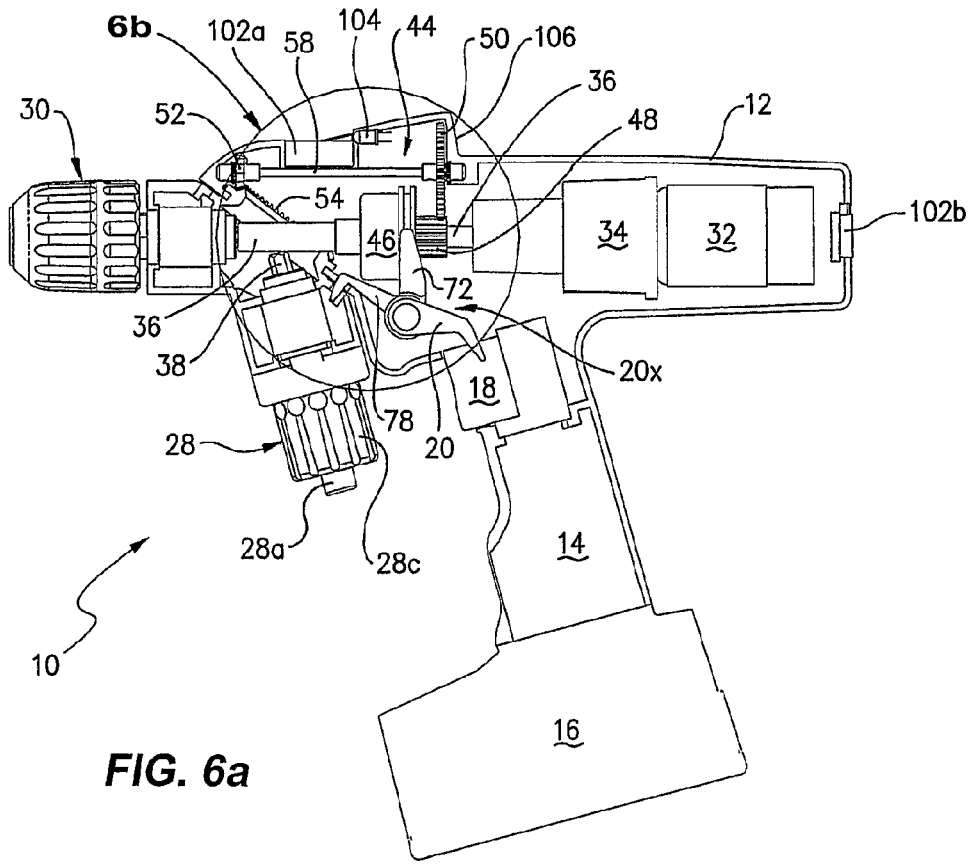
FIG. 6a is a similar view to that of FIGS. 3a, 4a & 5a, this time showing the second chuck stationed at the position of use in front of the tool after the position of the first and second chucks has been fully interchanged.
Figure 6B:
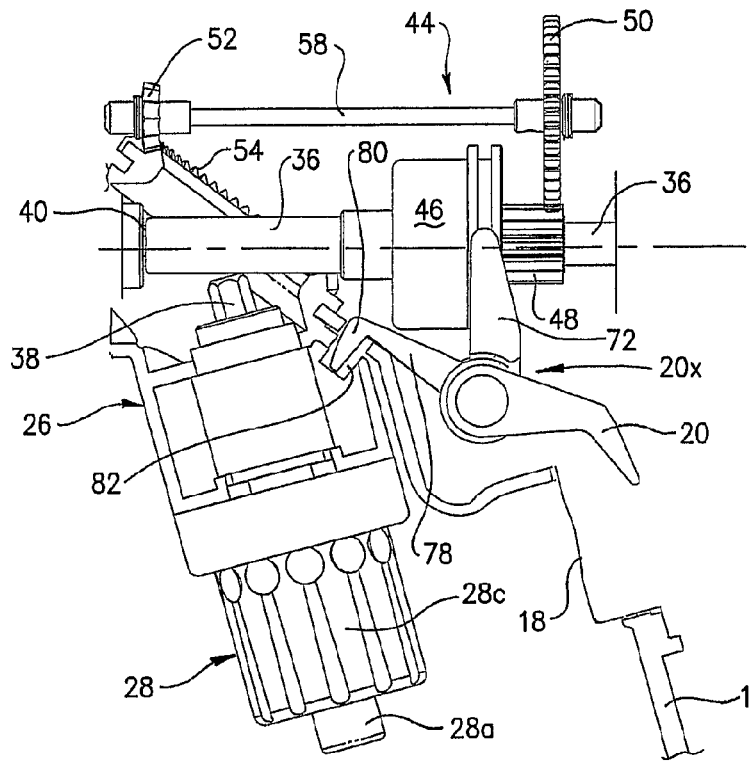

Upon disengagement of CCTRCAM 20x, drive shaft 36 shifts back to its first location (with new chuck 30 disposed at the position of use in front of tool 10—see FIGS. 6a & 6b) and at this time plug formation 42 of drive shaft 36 is re-engaged with hex connecting shaft 40 of chuck 30. CCTRCAM 20x, and hence, second trigger mean 20, are automatically reset at this point. Subsequent rotation of drive shaft 36 by way of selective activation of first trigger means 18, then enables tool 10 to be used relative to chuck 30.

It will be appreciate that in order to interchange chucks 28,30 once again, a user can simply perform the same procedure over and over as desired.

What is also shown in FIGS. 1a to 8e, are a number of additional preferred features of tool 10. It will be appreciated that these additional features are not essential to tool 10 of the present invention.

Referring particularly to FIG. 3a, it can be seen that tool 10 also includes a number of visible spirit level gauges 102 to assist a user with horizontal and/or vertical alignment. Disposed on top of tool casing 12, is a first horizontal alignment spirit level gauge 102a. Whilst, disposed at the rear of tool casing 12 is a second vertical alignment spirit level gauge 102b.

Again referring particularly to FIG. 3a, it can be seen that tool 10 may also include at least one LED hi-intensity work light 104 built into tool casing 12, and facing the position of use of tool 10, such that when first trigger means 18 is activated, LED work light 104 is switched ON to illuminate an area in front of the position of use of tool 10.

In FIGS. 1a to 6b, it can be seen that due to the raised section provided in tool casing 12 to accommodate layshaft drive gear 50, a convenient dashboard section 106 may be provided on tool 10 which can be used to, for example, display a battery condition meter (not shown). It is preferred that the battery condition meter is a multi-stage light trail indicator.

Figure 9A:
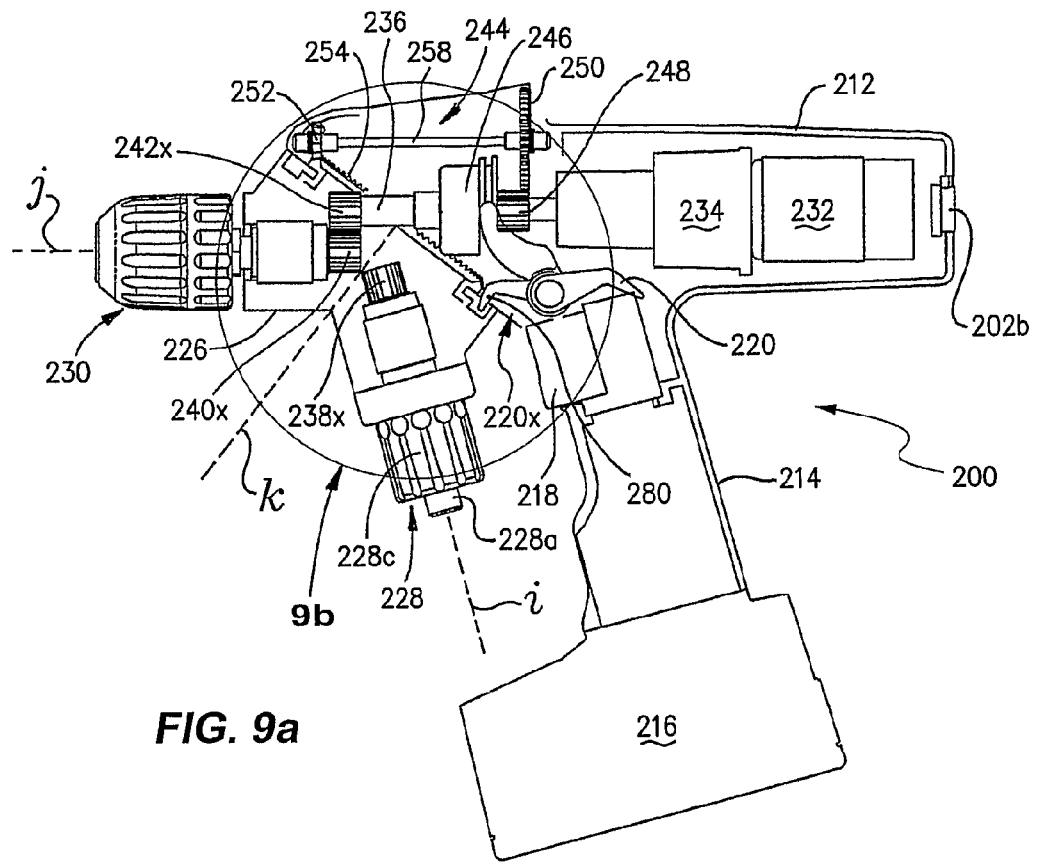
FIG. 9a is a cross-sectional left side view of a multiple chuck hand tool made in accordance with a third preferred embodiment of the present invention, the multiple chuck hand tool shown having a second chuck stationed at a position of use in front of the tool.
Figure 9B:
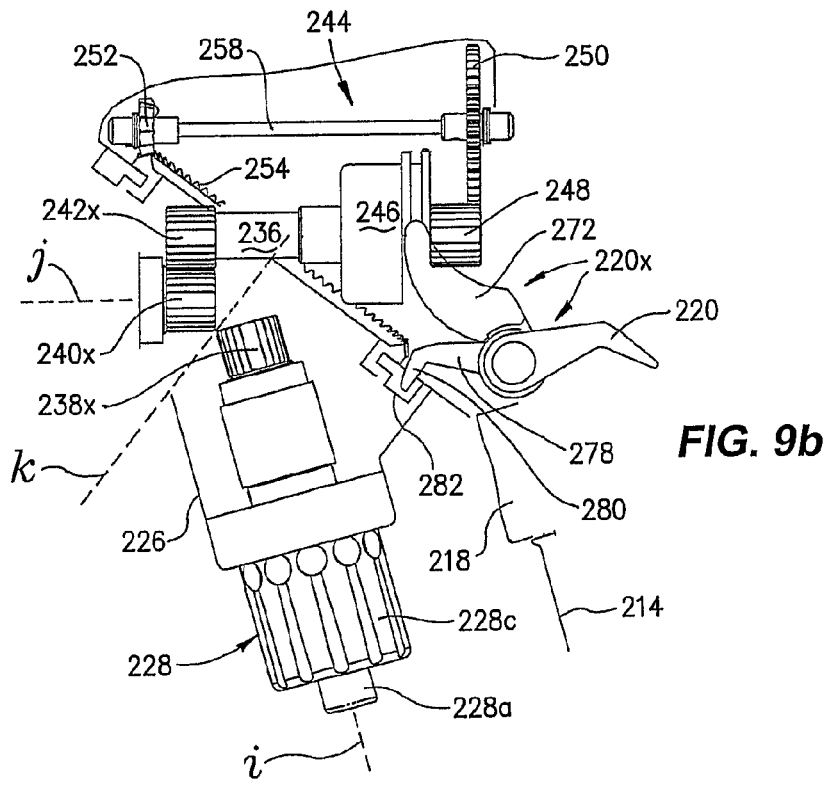
FIG. 9b is an enlarged cross-sectional view of the correspondingly marked circled region of the multiple chuck hand tool shown in FIG. 9a; and, FIGS. 10a to 10e are various views of a multiple chuck hand tool made in accordance with a fourth preferred embodiment of the present invention, the multiple chuck hand tool being particularly suitable for attachment to a standard single chuck power drill.
Figure 10A:
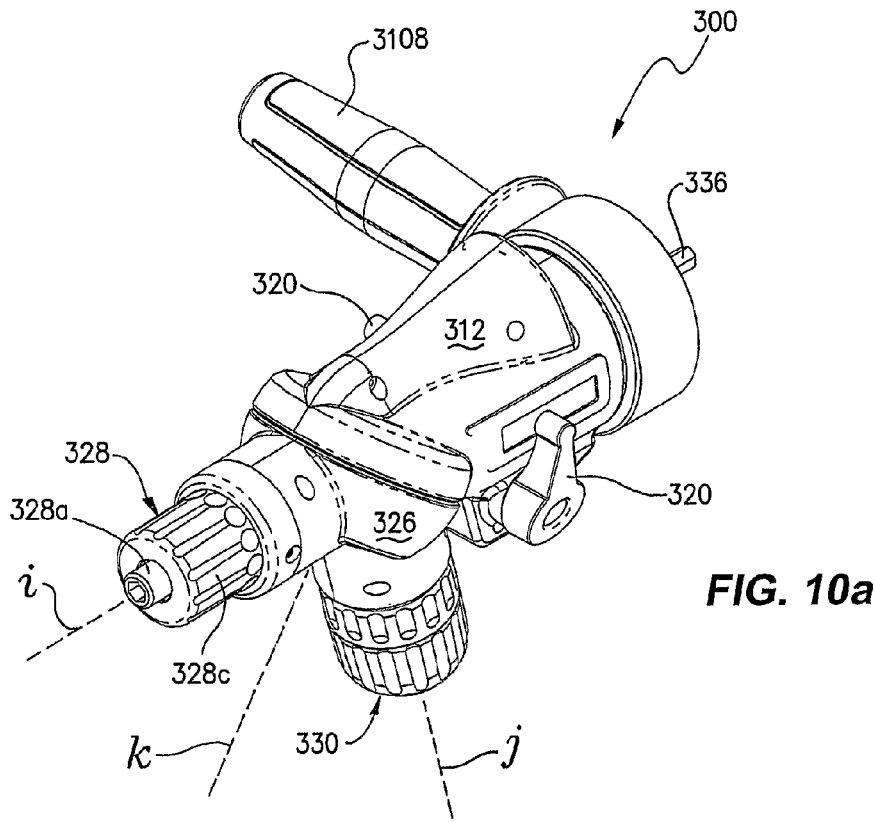
Figure 10B:
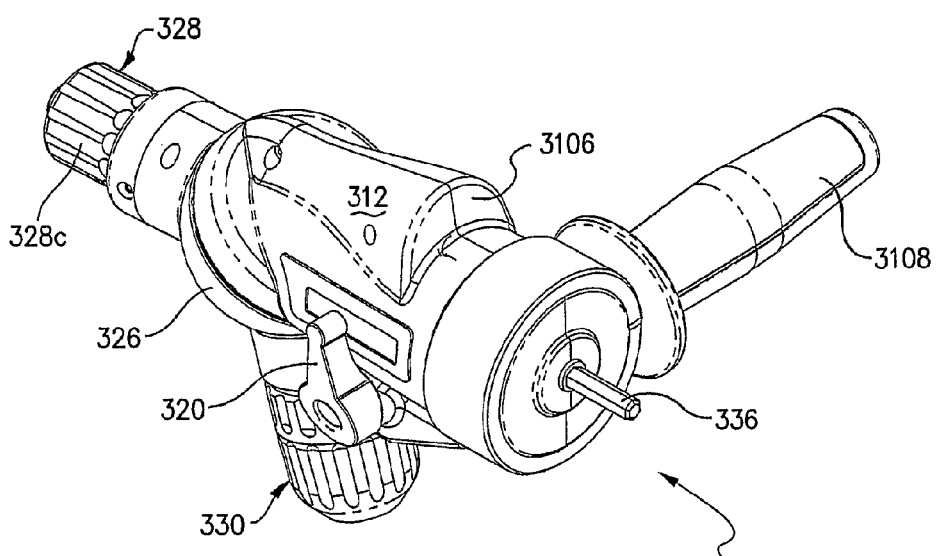
Figure 10C:
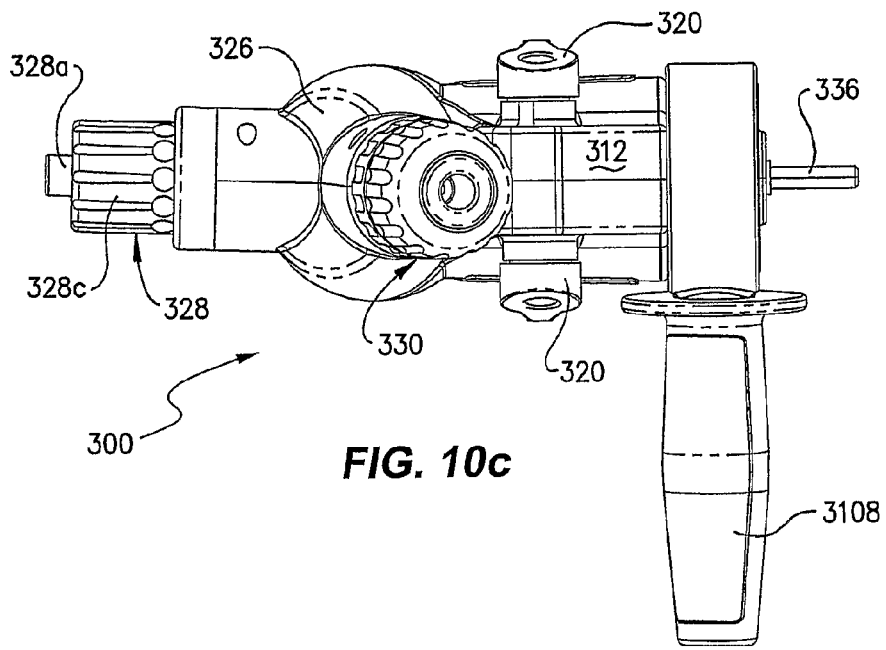
Figure 10D:
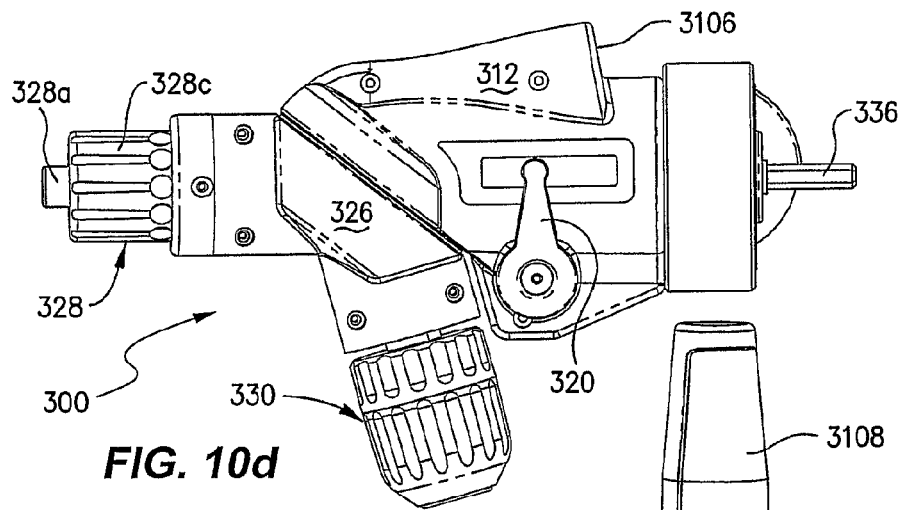
Figure 10E:
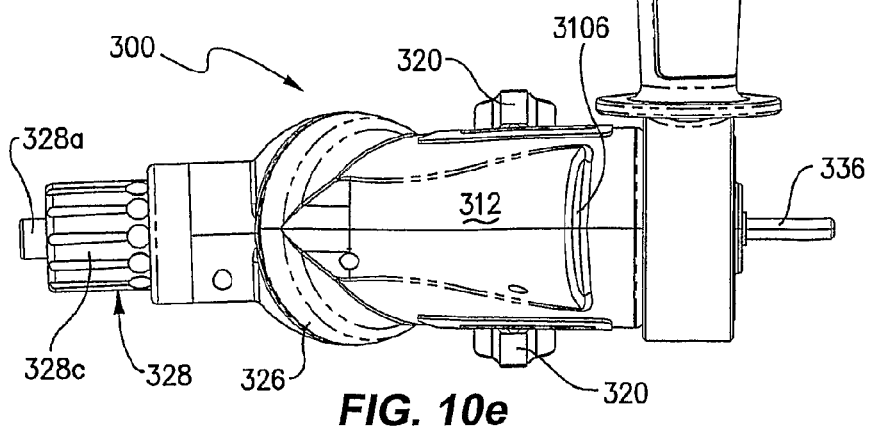

In FIGS. 9a & 9b, there is shown a multiple chuck hand tool 200 (hereinafter simply referred to as "tool 200") of any suitable form, for example an electric drill as shown, made in accordance with a third preferred embodiment of the present invention. Although shown in the drawings as being an electric drill it should be understood that tool 200 may be embodied in many other forms (see for example the fourth preferred embodiment shown in FIGS. 10a to 10e) and as such the invention is not limited to the specific example provided. In FIGS. 9a & 9b, like reference numerals correspond to like parts shown in FIGS. 1a to 8l.

Tool 200 of FIGS. 9a & 9b varies to that of tools 10,100 of FIGS. 1a to 8l with respect to the way in which drive shaft 236 is engaged with (and in drive connection to) chucks 228,230 at the position of use in front of the tool 200. More particularly, drive shaft 236 of tool 200 is fixed, or non-reciprocating, relative to chucks 228,230, as compared to the reciprocating drive shaft 36,136 arrangement of tools 10,100 shown in FIGS. 1a to 8l, which can be moved between two axially-spaced locations.

In this alternative preferred embodiment, to enable tool 200 to establish a drive connection with a respective chuck 228,230 at the position of use in front of tool 200, fixed drive shaft 236 of tool 200 is disposed in parallel to the rear connecting shafts (not shown) of chucks 228,230. To enable the rotational drive of drive shaft 236 to be applied to the rear connecting shafts of chucks 228,230, each of the rear connection shafts have gears 238x,240x formed thereon which cooperate with a complementary gear 242x formed on the end of drive shaft 236. In this way (referring particularly to the position of chuck 230 in FIGS. 9a & 9b) the gear 242x of drive shaft 236 can be meshed with the gear 240x formed on the rear connecting shaft (not shown) of chuck 230 so that any rotational drive applied to drive shaft 236 is transferred to chuck 230 at the forward end of drill 200.

As drive shaft 236 of tool 200 is fixed and does not need to be reciprocated in order to engage and disengage a respective chuck 228,230, in this alternative preferred embodiment, clutch mechanism 246 is designed to simply slide relative to drive shaft 236 as CCTRCAM 220x is activated by way of second trigger means 220. Hence, upon activation of second trigger means 220, CCTRCAM 220x of tool 200 shown in FIGS. 9a & 9b only engages clutch mechanism 246, and thus does not reciprocate drive shaft 236, in order to set layshaft gear train 244 into motion.

Other than this alternative arrangement of the drive shaft 236 with respect to the chucks 228,230 when located at the position of use in front of the tool 200, and more particularly the way in which a drive connection is established with same, the operation of tool 200 is essentially the same as that described with reference to tools 10,100 shown in FIGS. 1a to 8l. For this reason, a detailed discussion of the remaining components and the operation thereof will not be provided with reference to tool 200.

This alternative preferred embodiment therefore clearly demonstrates that the present invention is not limited to a tool 10,100,200 having a reciprocating drive shaft. Instead, it should be appreciate that many other constructional arrangements (not shown) could also be used in accordance with the present invention, and without departing from the spirit and scope of the invention herein described. Such variations in design are therefore intended to be included within the scope of the present application.

In FIGS. 10a to 10e, there is shown a multiple chuck hand tool 300 (hereinafter simply referred to as "tool 300") of any suitable form, for example, an attachment for a conventional power drill as shown, made in accordance with a fourth preferred embodiment of the present invention. In FIGS. 10a to 10e, like reference numerals correspond to like parts shown in FIGS. 1a to 9b.

Tool 300 of FIGS. 10a to 10e varies to that of tools 10,100, 200 of FIGS. 1a to 9b with respect to the way in which selective rotation is applied to drive shaft 336. More particularly, as tool 300 is an "multiple chuck attachment" for a conventional power drill (not shown), as opposed to a multiple chuck power tool itself (as in the case of tools 10,100, 200 of FIGS. 1a to 9b), drive shaft 336 of tool 300 is designed to be rotated by a separate drilling, or other similar rotating, device, and not an integral motor 32,132,232 as in the case of tools 10,100,200. Other than that distinct difference, tool 300 essentially operates in the same fashion to that described earlier with reference to tools 10,100,200 of FIGS. 1a to 9b. Hence a detailed discussion of the internal components of tool 300 is not necessary.

To enable tool 300 to be manipulated and controlled, tool 300 includes an adjustable handle 3108 which can be positioned as desired at either side of tool 300, i.e. for left or right handed operation.

In the case of any one of tools 10,100,200,300 of FIGS. 1a to 10e, although not shown in the drawings, it is envisaged that tools 10,100,200,300 could include means for attachment of a screw feeding/loading device (not shown) that can be loaded with a cassette of screws, or the likes, to automate the application of same to a work surface. Such a device could be removably coupled to any one of the multiple chucks, the turret, of possibly the tool casing.

While this invention has been described in connection with specific embodiments thereof, it will be understood that it is capable of further modification(s). The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

Finally, as the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and the appended claims. Therefore, the specific embodiments are to be understood to be illustrative of the many ways in which the principles of the present invention may be practiced.

The invention claimed is:

1. A tool comprising:
a drive shaft having an axis of rotation;
a plurality of bit holders interchangeable with one another at a position of use, the bit holders being mounted on a turret rotatable around an axis at an angle to the axis of rotation of the drive shaft, the drive shaft being in drive connection with a respective bit holder at the position of use; and
means for engaging a clutch to activate a drive train to establish a drive connection between the drive shaft and the turret so that subsequent operation of the drive shaft rotates the turret to interchange the positions of the bit holders at the position of use, and wherein after the turret has been rotated the clutch is disengaged to deactivate the drive train to prevent rotation of the turret.

2. The tool as claimed in claim 1, wherein the drive train is a gear train which is inactive until such time that the clutch is engaged by way of the clutch engagement means.

3. The tool as claimed in claim 2, wherein the gear train is in constant mesh with the drive shaft and the turret such that there is no crashing of any of the gears of the gear train upon engagement of the clutch.

4. The tool as claimed in claim 2, wherein the gear train is a layshaft gear train which is disposed above the drive shaft of the tool.

5. The tool as claimed in claim 4, wherein the clutch is affixed to a gear which is in constant mesh with a cooperating layshaft drive gear that is disposed on one end of a layshaft.

6. The tool as claimed in claim 5, wherein a turret drive gear is disposed at the other end of the layshaft and that turret drive gear is in constant mesh with a turret rotation gear that is affixed to, or is integral with, the turret of the tool.

7. The tool as claimed in claim 6, wherein the layshaft mounted turret drive gear is a bevel gear pinion, and the turret mounted turret rotation gear is a bevel gear crown.

8. The tool as claimed in claim 5, wherein the clutch is axially aligned with the drive shaft and the drive shaft passes therethrough such that it can establish a drive connection with the bit holder at the position of use.

9. The tool as claimed in claim 8, wherein the clutch and the gear affixed thereto are non-functioning until such time that the clutch is engaged by way of the clutch engagement means.

10. The tool as claimed in claim 4, wherein the drive shaft is reciprocal between a first axially-spaced location at which the drive shaft is engaged with a respective bit holder at the position of use and a second axially-spaced location at which the drive shaft is disengaged from the respective bit holder at the position of use.

11. The tool as claimed in claim 10, wherein activation of the clutch engagement means also moves the drive shaft from its first location to its second location which disengages the drive shaft from the bit holder at the position of use and allows the turret to be rotated by way of the layshaft gear train, wherein after the turret has been rotated the drive shaft returns to its first location and reestablishes a drive connection with the bit holder at the position of use.

12. The tool as claimed in claim 1, wherein the drive shaft is fixed and non-reciprocating, and engagement with a bit holder at the position of use is provided by way of bit holder engagement shafts which when engaged with the drive shaft are disposed in parallel to the drive shaft.

13. The tool as claimed in claim 12, wherein the drive shaft and the bit holder engagement shafts include cooperating gears to enable a drive connection to be applied to the bit holder at the position of use.

14. The tool as claimed in claim 1, wherein the clutch engagement means is an activation mechanism that is selectively operable by way of at least one trigger means.

15. The tool as claimed in claim 14, wherein the at least one trigger means is affixed to, or is integral with, the activation mechanism such that when force is applied to the at least one trigger means the activation mechanism mechanically engages the clutch by way of an integral yoke means.

16. The tool as claimed in claim 15, wherein the activation mechanism also includes at least one pawl means that locks the turret in place until such time that the at least one trigger means is engaged.

17. The tool as claimed in claim 16, wherein the yoke means is coupled to the clutch such that when force is applied to the at least one trigger means the clutch is engaged to activate the layshaft gear train.

18. The tool as claimed in claim 17, wherein the turret includes at least two notches that cooperate with the at least one pawl means, each of these notches corresponding to a predetermined alignment position of the turret such that when the at least one pawl means is received within a notch the turret is locked in place and a bit holder is properly aligned at the position of use.

19. The tool as claimed in claim 18, wherein upon engagement of the activation mechanism the at least one pawl means is removed from a first notch which allows the turret to rotate through a predetermined angle until such time that the at least one pawl means slips into a further notch which eliminates any further rotation of the turret.

20. The tool as claimed in claim 19, wherein the activation mechanism disengages automatically upon the at least one pawl means slipping into the further notch, and wherein, at this time the clutch operatively disengages from the drive train automatically.

21. The tool as claimed in claim 14, wherein the activation mechanism includes an escapement mechanism that relieves any unnecessary force that is applied to the at least one trigger means.

22. The tool as claimed in claim 1, wherein the tool is a pistol grip power drill and the bit holders are chucks.

23. The tool as claimed in claim 22, wherein the turret has an axis of rotation set at substantially 45° to the drive shaft axis, and is equipped with two chucks.

24. The tool as claimed in claim 23, wherein a first chuck is configured for screwing applications and includes a magnetic retain hex nose piece for receipt of tool bits, and a second chuck is a keyless drill chuck configured for drilling applications.

25. The tool as claimed in claim 24, wherein the first chuck includes an adjustable clutch means to control the rotational resistance that can be applied to that chuck to assist with screwing applications.

26. The tool as claimed in claim 22, further including at least one visible level gauge to assist a user with horizontal and/or vertical alignment.

27. The tool as claimed in claim 26, wherein the tool includes two visible level gauges, one for horizontal alignment and one for vertical alignment, and these level gauges are spirit level gauges.

28. The tool as claimed in claim 22, including at least one power trigger means to selectively establish rotation of the drive shaft.

29. The tool as claimed in claim 28, further including at least one LED hi-intensity work light built into a tool casing and facing the position of use, such that when the at least one power trigger means is activated the LED work light is switched on to illuminate an area adjacent the position of use.

30. The tool as claimed in claim 22, wherein a casing of the tool includes a dashboard section for displaying a battery condition meter, the battery condition meter being a multi-stage light trail indicator.

31. The tool as claimed in claim 1, wherein the tool is an attachment for a pistol grip power drill, and the bit holders are chucks.

32. A tool comprising:
a drive shaft having an axis of rotation;
a turret rotatable about a turret axis that is at angle relative to the axis of rotation of the drive shaft, wherein the turret includes a plurality of bit holders interchangeable with one another between a use position and a non-use position;
a turret drive operatively coupled to the drive shaft via a clutch; and
a hand-activated turret release to move the clutch between a first position to operatively couple the turret drive and the drive shaft so that operation of the drive shaft rotates the turret to interchange the positions of the plurality of bit holders and a second position to operatively decouple the turret drive and the drive shaft to prevent rotation of the turret when the one of the plurality of bit holders is in the use position, wherein the clutch includes a gear in constant mesh with a gear of the turret drive when the clutch is in the first position and the second position.

33. A tool of claim 32, wherein the hand-activated turret release is activated via a trigger to operatively couple the turret drive and the drive shaft, and the hand-activated turret release is automatically deactivated to operatively decouple the turret drive and the drive shaft after one of the plurality of bit holders is moved from the use position to the non-use position or the non-use position to the use position.

34. A tool of claim 32, wherein the turret drive includes a layshaft to operatively couple the gear of the turret drive, the gear of the clutch, and a gear of the turret.

35. A tool of claim 32, wherein the trigger comprises a yoke that engages a groove of the clutch housing.

36. A tool of claim 32, wherein the hand-activated turret release moves a friction plate coupled the drive shaft into frictional engagement with the clutch to drive the turret drive when the hand-activated turret release is activated.

* * * * *